United States Patent
Murriner et al.

(10) Patent No.: US 11,599,835 B2
(45) Date of Patent: Mar. 7, 2023

(54) SYSTEMS AND METHODS FOR PROCESSING BEHAVIORAL ASSESSMENTS

(71) Applicant: cloverleaf.me, inc., Covington, KY (US)

(72) Inventors: Darrin Murriner, Fort Thomas, KY (US); Ford Knowlton, Bellevue, KY (US); Levi Bethune, Cincinnati, OH (US)

(73) Assignee: cloverleaf.me, inc., Covington, KY (US)

( * ) Notice: Subject to any disclaimer, the term of this patent is extended or adjusted under 35 U.S.C. 154(b) by 429 days.

(21) Appl. No.: 15/977,206

(22) Filed: May 11, 2018

(65) Prior Publication Data
US 2018/0330310 A1 Nov. 15, 2018

Related U.S. Application Data

(60) Provisional application No. 62/505,453, filed on May 12, 2017.

(51) Int. Cl.
*G06Q 10/06* (2012.01)
*G06Q 10/0631* (2023.01)
*G06Q 10/1053* (2023.01)
*G06Q 10/0639* (2023.01)
*G06F 3/0482* (2013.01)
*G09B 7/00* (2006.01)

(52) U.S. Cl.
CPC ........... *G06Q 10/063118* (2013.01); *G06Q 10/06393* (2013.01); *G06Q 10/1053* (2013.01); *G06F 3/0482* (2013.01); *G09B 7/00* (2013.01)

(58) Field of Classification Search
None
See application file for complete search history.

(56) References Cited

U.S. PATENT DOCUMENTS

| | | | |
|---|---|---|---|
| 2005/0080655 A1* | 4/2005 | Sengir | G06Q 10/06398 705/7.27 |
| 2013/0124631 A1* | 5/2013 | Rosansky | H04L 65/403 709/204 |
| 2013/0344968 A1* | 12/2013 | Halfteck | A63F 13/79 463/43 |
| 2014/0358606 A1* | 12/2014 | Hull | G06Q 10/063112 705/7.14 |
| 2018/0218309 A1* | 8/2018 | Keen | A61B 5/167 |

* cited by examiner

Primary Examiner — Cory W Eskridge
(74) Attorney, Agent, or Firm — Ulmer & Berne LLP

(57) ABSTRACT

Embodiments described herein include systems and methods for processing behavioral assessments. One embodiment includes a computing device that stores logic that causes the system to receive data from a first behavioral assessment, the first behavioral assessment assessing a first behavioral characteristic of a first person, receive data from a second behavioral assessment, the second behavioral assessment assessing a second behavioral characteristic of the first person, and utilize the first behavioral characteristic from the first behavioral assessment and the second behavioral characteristic from the second behavioral assessment to calculate a behavioral parameter for the first person. In some embodiments, the logic causes the system to compare the behavioral parameter against a corresponding behavioral parameter for a second person to determine how the first person and the second person would work together and provide data about how the first person and the second person would work together.

19 Claims, 32 Drawing Sheets

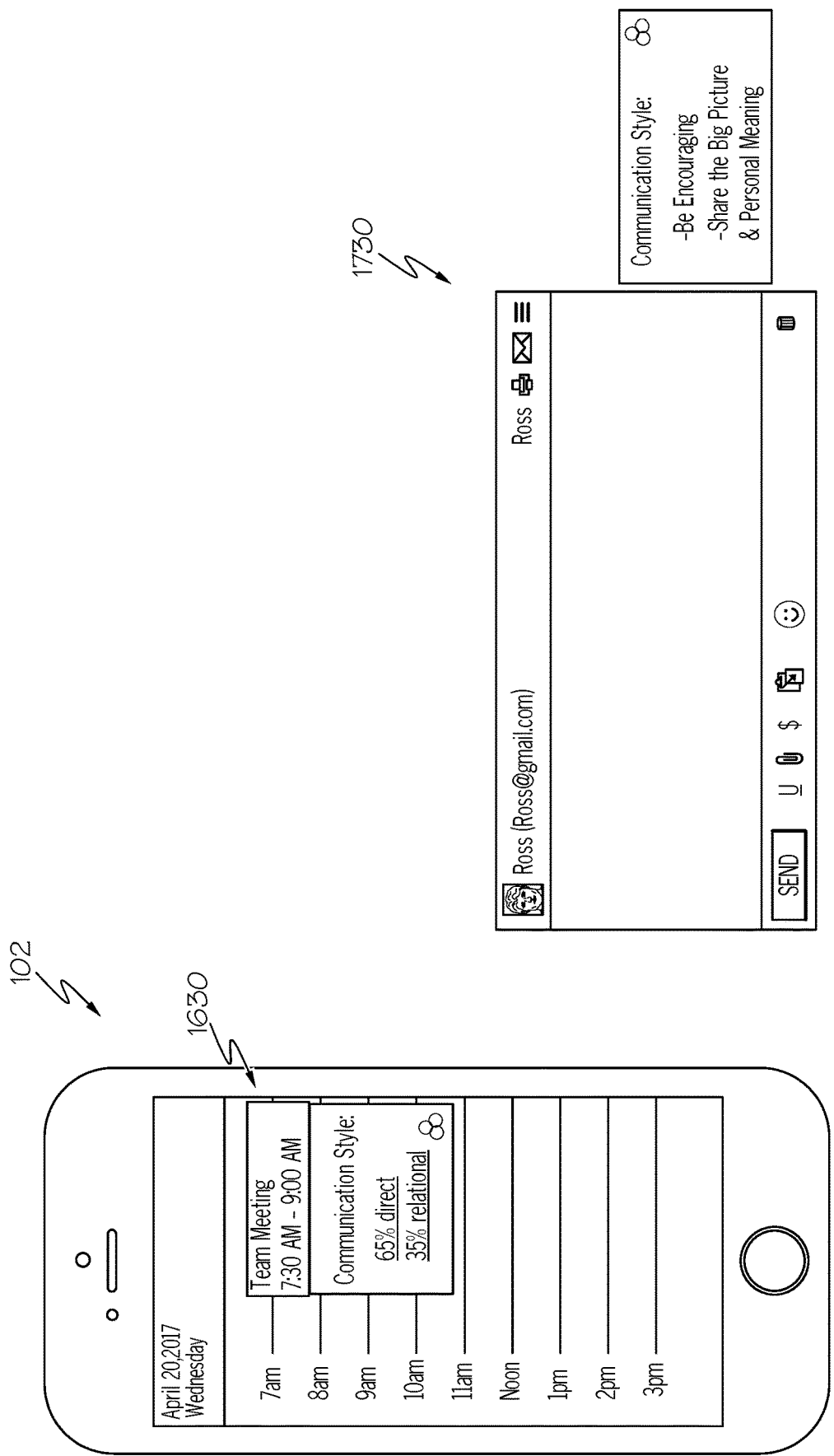

FIG. 18

Skills & Competencies

Social Integration: Darrin Murriner disconnect

Job Positions:
- Cofounder at Cloverleaf Me (7/2016 – now)

Skills: Darrin_Murriner_resume2016.docx

We recommend displaying your top 10 to 20 skills.
Start typing below to add new skills type your skill:

- ✖ Financial Planning
- ✖ Internal Audit
- ✖ Business Strategy
- ✖ Business Development — INTERMEDIATE
- ✖ Accounting
- ✖ Fundraising
- ✖ Communication
- ✖ Coaching

CANCEL    DONE

FIG. 21

Development Plan v1.4

Board Development    Due: 06/30/2018    [Kirsten Moorefield ✖]

Description    Educate myself on Board development

Training/Resources    Will talk with Tim/Sue on thoughts about creating this. Timing, typical agendas, etc.
Example text Support & Accountability    Investors will hold me accountable Measurement    Regularly scheduled meetings

FIG. 23

| Home/Admin/All Jobs | | | | | | |
|---|---|---|---|---|---|---|
| ALL JOBS | | | | | | |
| + Add New | | | | | | Displaying 1-20 of 20 results |
| Company | Job Title | Customer | Payment Status | Connected Teams | Applicants # ▾ | Valid to | Status |
| Epipheo | Digital Marketing Strategist | Dan Chaney | O | Epipheo | 62 | 06/20/2017 | Inactive | ✓ 🖉 🗑 |
| Carabello Coffee | Barista | Emily Carabello | O | Team Carabello | 27 | 01/31/2018 | Active | ⊘ 🖉 🗑 |
| Epipheo | Administrative Assistant | Dan Chaney | O | Epipheo | 15 | 02/01/2017 | Active | ⊘ 🖉 🗑 |
| Epipheo | Art Director | Dan Chaney | O | Epipheo McClure Squad | 14 | 12/22/2016 | Inactive | ✓ 🖉 🗑 |
| Altiora Group LLC | Administrative Assistant | Pamela Clark | O | Altiora | 11 | 12/21/2017 | Active | ⊘ 🖉 🗑 |
| Carabello Coffee | Cafe Manager | Emily Carabello | O | Team Carabello | 5 | 01/01/2017 | Active | ⊘ 🖉 🗑 |

FIG. 24

Home/Admin/All Jobs/Edit Result

| Job Details | Applicants | Orders |

Administrators: [Darrin Murriner ✖] [Levi Bethune ✖]

Position: Digital Marketing Strategist

Job Alias: digital-marketing-strategist

Industry: Marketing and Advertising

Sponsor the job: No

Choosing to sponsor this job will display the job at the top of job listings for Cloverleaf users. Please note that an additional charge of $20.00.

How to Apply:
○ Directly through Cloverleaf
○ Through the Company Website

Valid Period: +180 days

Status: Inactive

Company: Epipheo

Company Description:
EPIPHANY + VIDEO.
An epiphany is a sudden, intuitive perception of the reality, or perceived meaning, of a thing. So basically, if you didn't get it, and then you suddenly do get it, you just had an epiphany. We use that word a lot. In fact, 62.5% of the word "epiphany"

City: Cincinnati

State: Ohio

Country: United States

Zip: 45201

Connected Teams: [Epipheo ✖]

FIG. 25

SYSTEMS AND METHODS FOR PROCESSING BEHAVIORAL ASSESSMENTS

CROSS REFERENCE

This application claims the benefit of U.S. Provisional Application Ser. No. 62/505,453, filed on May 12, 2017, which is incorporated by reference in its entirety.

TECHNICAL FIELD

Embodiments described herein generally relate to systems and methods for processing behavioral assessments and, more specifically, to compiling and analyzing a plurality of behavioral assessments from a plurality of different sources.

BACKGROUND

Currently various behavioral assessment services are available that allow users to take a behavioral test and compare their personal results against other tests they have taken. Additionally, the tests are oftentimes administered by employers such that the results may be used to better understand the people that the employer utilizes. As an example, DISC™, Myers-Briggs™, Birkman™, Enneagram™, Strengths™, Caliper™, Profile XT™, and/or other assessments may be taken by individuals and analyzed by employers. While these behavioral assessments are often beneficial, each behavioral assessment provides different results and employers have nothing to do with that data once the particular behavioral assessment is complete. As such, a need exists in the industry.

SUMMARY

Embodiments described herein include systems and methods for processing behavioral assessments. One embodiment of a system includes a computing device that stores logic that, when executed by the computing device, causes the system to receive data from a first behavioral assessment, the first behavioral assessment assessing a first behavioral characteristic of a first person, receive data from a second behavioral assessment, the second behavioral assessment assessing a second behavioral characteristic of the first person, and utilize the first behavioral characteristic from the first behavioral assessment and the second behavioral characteristic from the second behavioral assessment to calculate a behavioral parameter for the first person. In some embodiments, the logic causes the system to compare the behavioral parameter against a corresponding behavioral parameter for a second person to determine how the first person and the second person would work together and provide data about how the first person and the second person would work together.

Embodiments of a non-transitory computer readable medium include logic that, when executed by a computing device, cause the computing device to receive data from a first behavioral assessment, the first behavioral assessment assessing a first behavioral characteristic of a first person, receive data from a second behavioral assessment, the second behavioral assessment assessing a second behavioral characteristic of the first person, and utilize the first behavioral characteristic from the first behavioral assessment and the second behavioral characteristic from the second behavioral assessment to calculate a behavioral parameter for the first person. In some embodiments, the logic causes the computing device to provide a user interface that provides data about how the first person would fit into a predetermined team.

Another embodiment of a system may include a computing device that stores logic that, when executed by the computing device, causes the system to receive data from a first behavioral assessment, the first behavioral assessment assessing a first behavioral characteristic of a first person, receive data from a second behavioral assessment, the second behavioral assessment assessing a second behavioral characteristic of the first person, and utilize the first behavioral characteristic from the first behavioral assessment and the second behavioral characteristic from the second behavioral assessment to calculate a behavioral parameter for the first person. In some embodiments, the logic causes the system to compare the behavioral parameter against a corresponding behavioral parameter for a second person to determine how the first person and the second person would work together and provide data about how the first person and the second person would work together.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 16 depicts a user interface for providing behavioral data associated with meeting participants, according to embodiments described herein;

FIG. 17 depicts a user interface for providing communication details associated with a recipient of an electronic communication, according to embodiments described herein;

FIG. 18 depicts a user interface for providing communication details associated with a recipient of an electronic communication, according to embodiments described herein;

FIG. 21 depicts a user interface for providing skills and competencies, according to embodiments described herein;

FIG. 23 depicts a user interface for providing a development plan, according to embodiments described herein;

FIG. 24 depicts a user interface for identifying candidate fit, according to embodiments described herein;

FIG. 25 depicts a user interface for providing job details associated with a candidate, according to embodiments described herein;

DETAILED DESCRIPTION

Embodiments disclosed herein include systems and methods for processing behavioral assessments. Some embodiments may be configured to receive results from a plurality of behavioral assessments for a plurality of different people. The people may be organized into teams (such as a first team and/or a second team and such as by a user who is the employer or potential employer of those people), so that the user can view a compiled assessment of the plurality of behavioral assessments, as well as view the team and the dynamics among the team members.

These embodiments may be configured to not only compile and display information from the behavioral and skill-based assessments, but to calculate and predict interactions among team members; recommend new teammates to a team based on these calculations and predictions; provide an interface for a user to define characteristics of a desired team; etc. Some embodiments may use assessments (including behavioral or psychometric assessments) to provide an evaluation of the level of skill of specific components of behavior including motivation, communication style, work style, conflict triggers, personal development approach, and leadership.

As such, embodiments may be configured to bring together multiple personality and strengths assessments into one view and into one database to draw insights on people in an organization. Embodiments also cross map these assessments to map results from one to likely results from the others. The systems and methods for processing behavioral assessments incorporating the same will be described in more detail, below.

Figure 1:
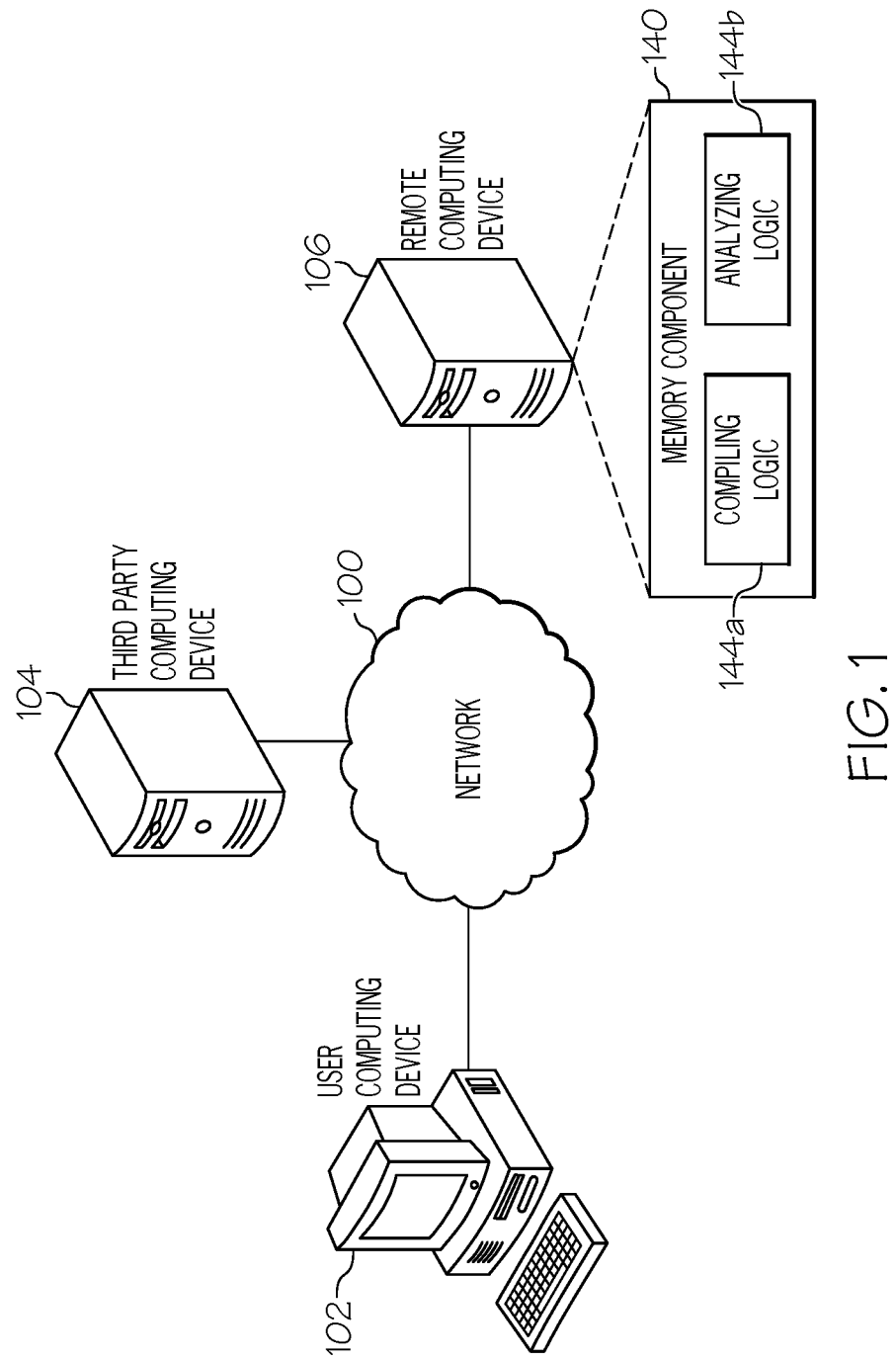
FIG. 1 depicts a computing environment for processing behavioral assessments, according to embodiments described herein.

Referring now to the drawings, FIG. 1 depicts a computing environment for processing behavioral assessments, according to embodiments described herein. As illustrated, a network 100 is coupled to a user computing device 102, a third party computing device 104, and a remote computing device 106. The network 100 may include any wide area network, local network, peer-to-peer network, etc. As an example, the network 100 may include the internet, a public switch telephone network, a cellular network (such as 3G, 4G, LTE, etc.), and/or the like. Similarly, the network 100 may include local networks, such as a local area network, Bluetooth network, Zigbee, near field communication, etc.

Coupled to the network 100 is the user computing device 102. The user computing device 102 may be configured as any computing device for a user to take one or more behavioral assessments such as via the third party computing device 104. Additionally, the user computing device 102 may be utilized to communicate with the remote computing device 106 for providing the user interfaces and functionality described in more detail below. While depicted in FIG. 1 as a desktop device, the user computing device 102 is not so limited. Some embodiments may be configured to provide the analysis and data described herein as a mobile device, laptop, tablet, server, etc.

The third party computing device 104 may be configured as a server, personal computer, laptop, mobile device, etc. and may be configured to provide one or more services (such as DISC™, Myers-Briggs™, Birkman™, Enneagram™, Strengths™, Caliper™, Profile XT™, etc.) for providing a behavioral assessment to a user on the user computing device 102. It should be noted that, as each behavioral assessment provider may be independently operated, the third party computing device 104 may include a plurality of separate computing devices that each provide the respective behavioral assessment.

The remote computing device 106 may be configured to communicate with the user computing device 102 and/or the third party computing device 104 via the network 100. As such, the remote computing device 106 may be configured as a server, personal computer, smart phone, laptop, notebook, etc. The remote computing device 106 may include a memory component 140, which stores compiling logic 144a and analyzing logic 144b. As described in more detail below, when executed by the remote computing device 106, the compiling logic 144a may be configured cause the remote computing device 106 to acquire and combine the results from a plurality of different behavioral assessments for a plurality of different individuals (who may or may not be users). The analyzing logic 144b may be configured cause the remote computing device 106 to analyze the results of the compiled data for making determinations regarding a person and/or selected groups of people.

It will be understood that while the compiling logic 144a and the analyzing logic 144b are depicted as residing in the memory component 140 of the remote computing device 106, this is merely an example. Some embodiments may be configured with logic for performing the described functionality in the user computing device 102. Similarly, some embodiments may be configured to utilize another computing device not depicted in FIG. 1 for providing at least a portion of the described functionality.

Figure 2:
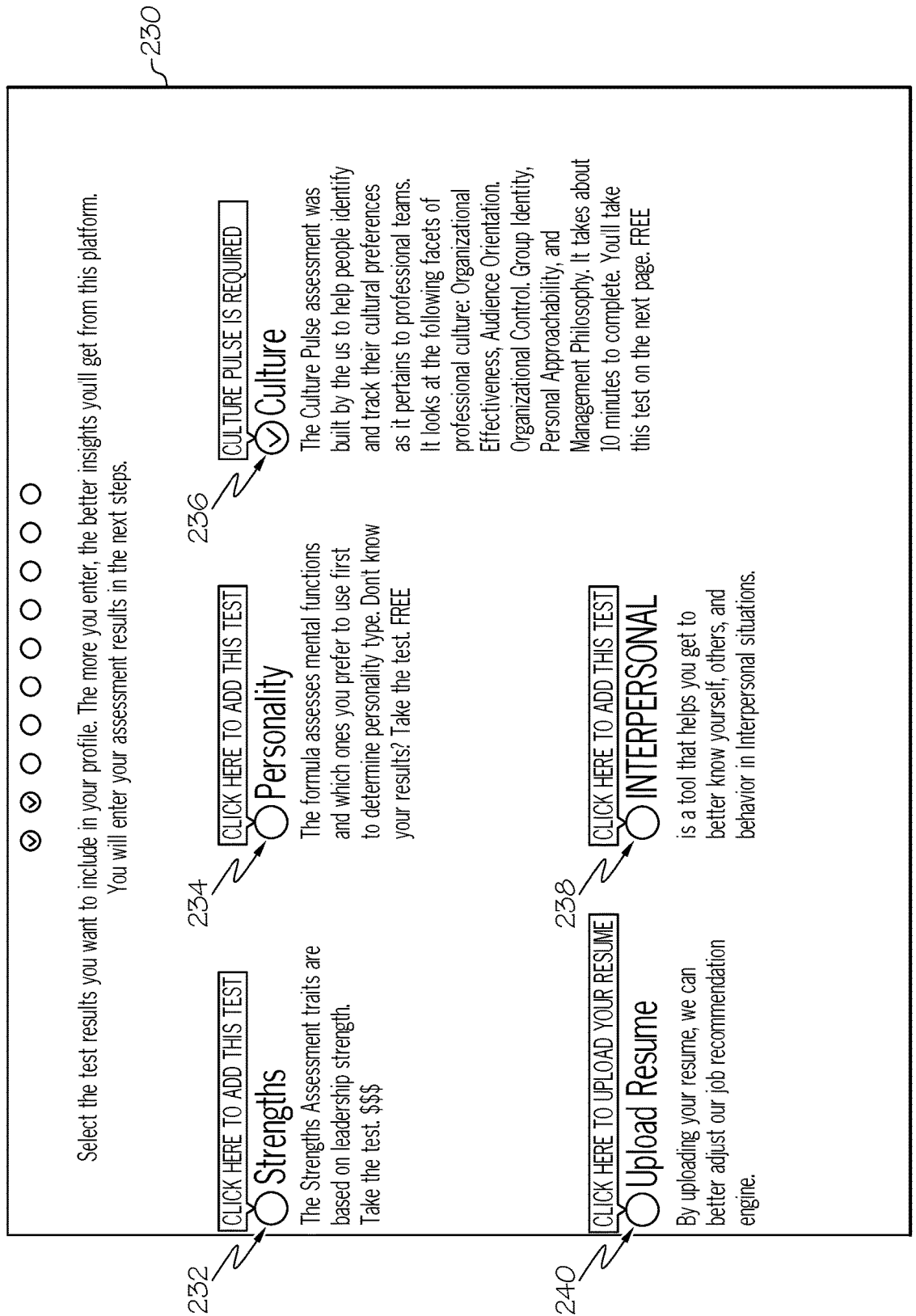
FIG. 2 depicts a user interface for selecting behavioral assessments for processing, according to embodiments described herein.

FIG. 2 depicts a user interface 230 for selecting behavioral assessments for processing, according to embodiments described herein. As illustrated, the user interface 230 includes a strengths option 232, a personality option 234, a culture option 236, and an interpersonal option 238, and a resume option 240. In response to selection of the strengths option 232, the user may be taken to a website or other portal to take a strengths behavioral assessment. If the person has already taken the strengths assessment, the user may upload the results of that assessment. In response to a user selection of the personality option 234, the user may upload and/or be taken to a portal to take the personality behavioral assessment. In response to selection of the culture option 236, a culture behavioral assessment may be taken and/or uploaded. In response to selection of the interpersonal option 238, an interpersonal behavioral assessment may be taken and/or uploaded. In response to selection of the resume option 240, the user may be provided with options for uploading his/her resume.

As an example, a person may participate in a DISC assessment for interpersonal classifications and may enter and/or upload the results of that assessment into the remote computing device 106. Similarly, Strengths™, VIA™, Enneagram™, Myers-Briggs™, Birkman™, and/or other behavioral assessments may be uploaded and/or linked.

In response to uploading the person's resume via the user interface 230, data related to the resume may be stored. Additionally, some embodiments may be utilized to analyze the resume for behavioral queues and/or for providing suggestions related to improving the resume itself. As an example, these embodiments may scan the data in the resume and may determine education background, career background, hobbies, etc., which may be utilized to determine behavioral information. Metadata, such as font, alignment, typographical errors, etc. may also be identified and utilized to further assess the behavioral characteristics of the person. As discussed in more detail below, this analysis may be compiled and combined with other data to provide a behavioral assessment and/or determine a behavioral characteristic of the person.

Figure 3:
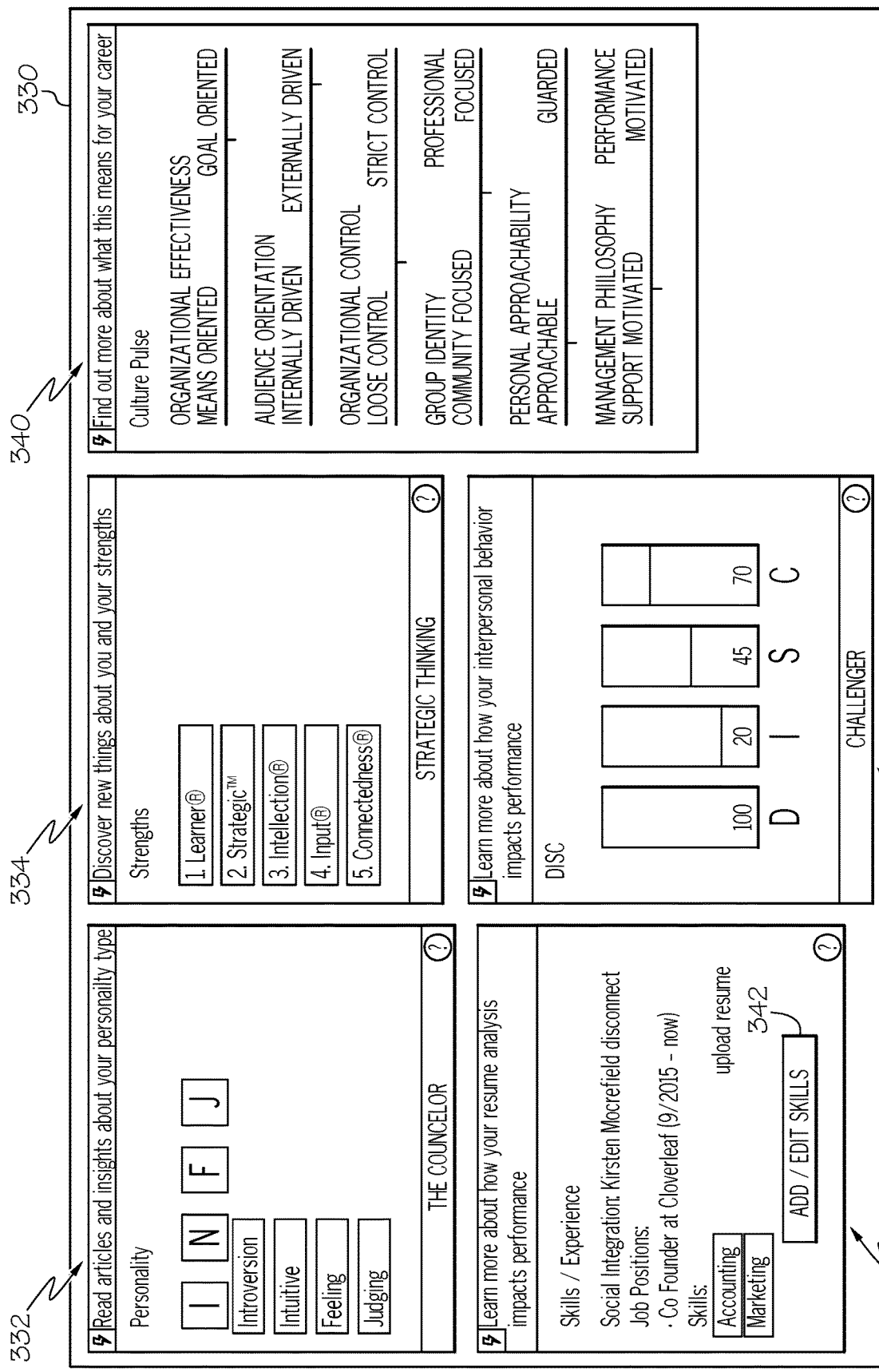
FIG. 3 depicts a user interface for providing behavioral traits, strengths, and culture in a behavioral assessment, according to embodiments described herein.

FIG. 3 depicts a user interface 330 for providing behavioral traits, strengths, and culture in a behavioral assessment, according to embodiments described herein. As discussed above, embodiments described herein may receive data related to one or more behavioral assessment that defines a behavioral characteristic. The behavioral characteristics may include strategic thinking, behavior-based performance, how the behavioral characteristic affects a career, etc. Specifically, the user interface 330 includes a personality section 332, a strengths section 334, a resume analysis section 336, an interpersonal section 338, and a culture pulse section 340.

The personality section 332 may provide information regarding various characteristics of the person's personality, such as via the personality option 234 from FIG. 2. The strengths section 334 may provide information related to the strengths option 232 from FIG. 2. The interpersonal section 338 may provide information related to the interpersonal option 238 from FIG. 2. The culture pulse section 340 may provide information associated with the culture option 236 from FIG. 2. The resume analysis section 336 may provide information related to the analysis from the uploaded resume. Also provided is a skills option 342 for the user to provide more information and/or edit the existing information related to skills of the person.

Figure 4:
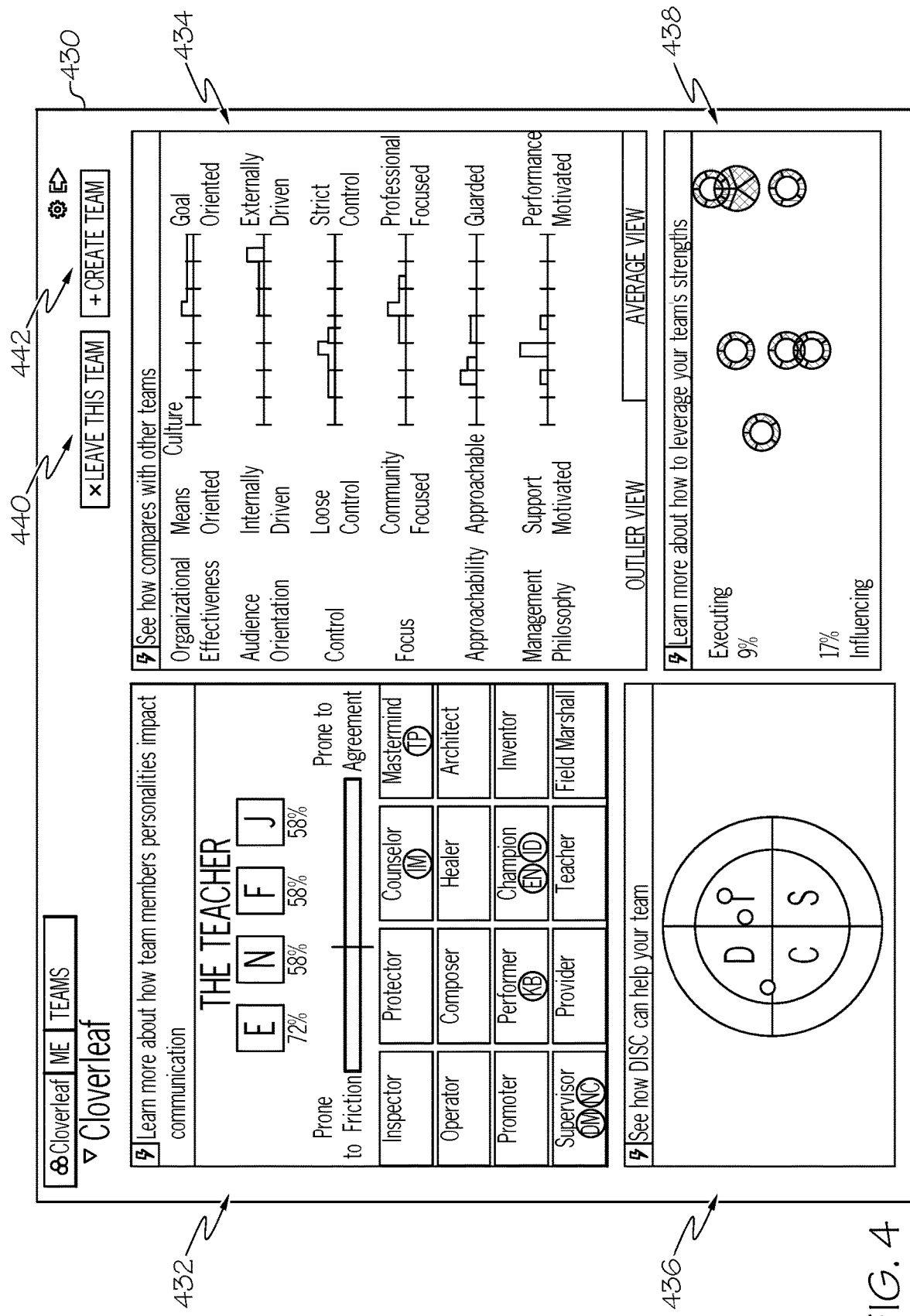
FIG. 4 depicts a user interface for processing behavioral assessments for a team, according to embodiments described herein.

FIG. 4 depicts a user interface 430 for processing behavioral assessments for a team, according to embodiments described herein. As illustrated, the user interface 430 may provide a plurality of people of a common organization, such as a business, sports team, social group, religious group, etc. who may all participate in the platform and submit data associated with behavioral assessment. The user may additionally indicate that a particular person is part of a team. As such, the user interface 430 may provide information regarding one or more people on that team. Specifically, an analysis may be performed that compares a behavioral characteristic of a particular person with a behavioral characteristic of a person on the team.

The user interface 430 may then show a user how a particular person interacts with the team as a whole and/or how the particular person interacts with other members of the team. Accordingly, the user interface 430 includes a personality section 432 that illustrates how the person's personality impacts communication with other team members. Specifically, embodiments described herein may compare personality-based behavioral assessments among the team members to provide this information.

A culture pulse section 434 may show how the person compares with other team members in the culture pulse behavioral assessment. An interpersonal section 436 may show how the person compares with regard to the interpersonal behavioral assessment. The strengths section 438 may provide information related to how the person compared with others team members in the strengths behavioral assessment. Also provided is a leave option 440 and a create team option 442 for leaving a current team and creating a new team, respectively.

It should be understood that, while the person may be compared to a team, some embodiments may be configured to determine a team ranking and/or team score, based on the behavioral assessments of the members of that team. The team ranking may then be compared with other teams to determine which teams may be best for a particular project.

Figure 5:
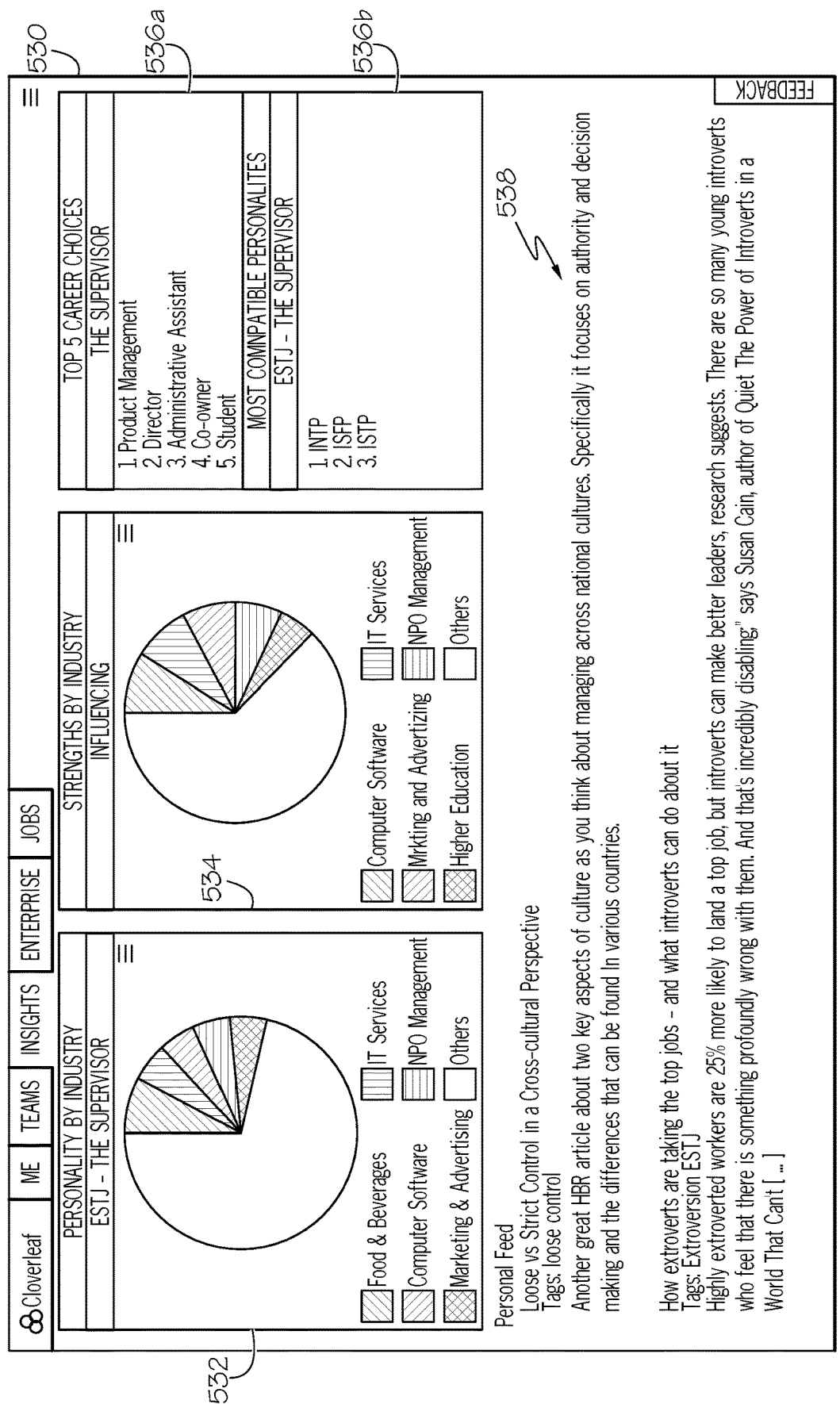
FIG. 5 depicts a user interface for providing insights of a personal feed, according to embodiments described herein.

FIG. 5 depicts a user interface 530 for providing insights of a personal feed, according to embodiments described herein. As illustrated, the user interface 530 includes a personality chart section 532, a strengths chart section 534, a career choices section 536a, a compatible personalities section 536b, and a personal feed section 538. Specifically, the personality chart section 532 graphically illustrates the industries that have people with a common personality assessment as the person. The strengths chart section 534 graphically depicts the industries that most often include people with a common strength assessment as the person. The career choices section 536a may provide one or more career choices for the person. The compatible personalities section 536b may provide those personalities that are most likely to be compatible with the person. The personal feed section 538 may provide articles, posts, and other information that is pertinent to the person and/or user.

Figure 6:
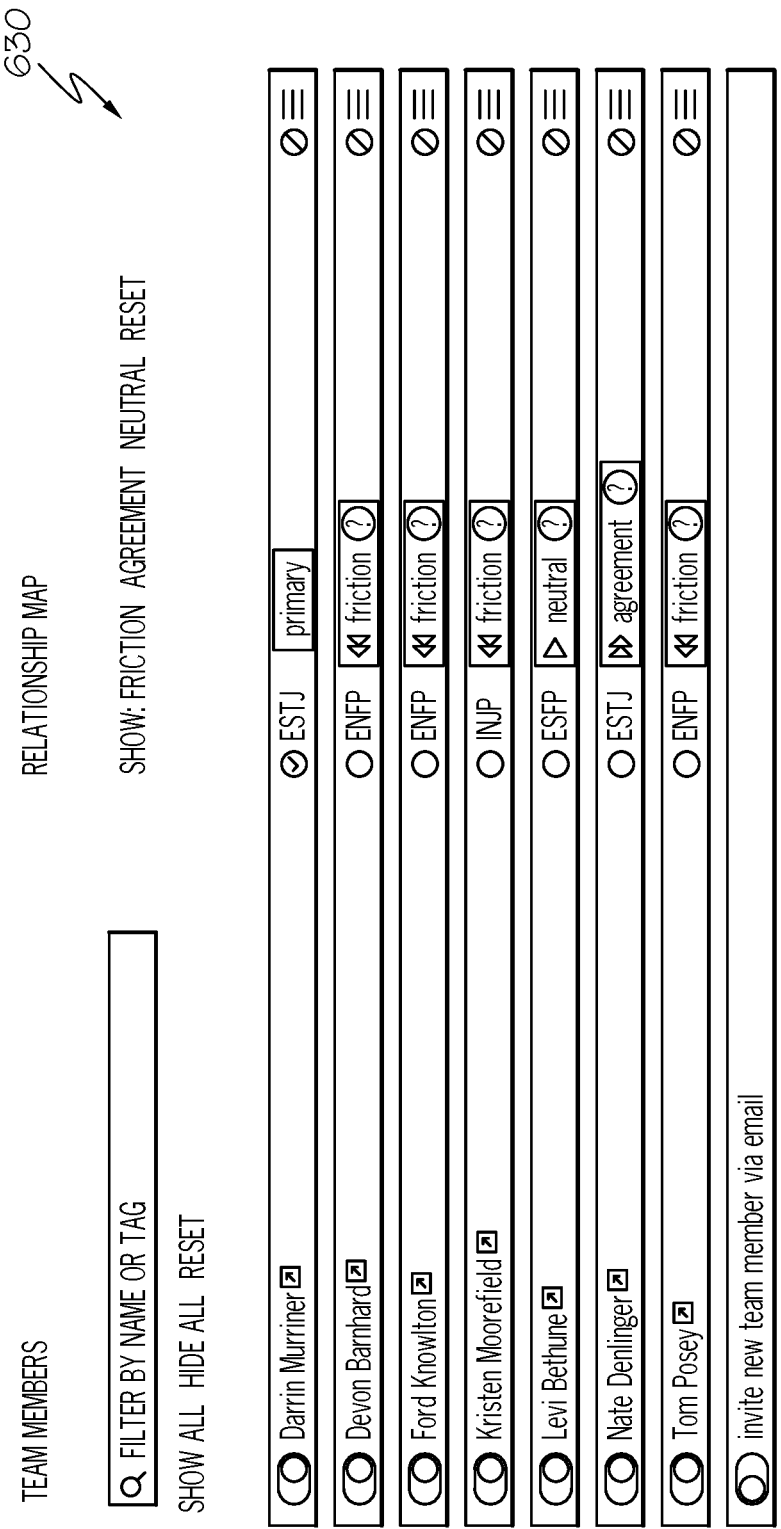
FIG. 6 depicts a user interface for providing a relationship map for a team, according to embodiments described herein.

FIG. 6 depicts a user interface 630 for providing a relationship map for a team, according to embodiments described herein. As illustrated, the user interface 630 provides a listing of each of the team members. The relationship map illustrates the likely friction or agreement between that team member and the selected "primary" team member. The user may select the desired "primary" team member and may activate and deactivate any team member from this analysis. The likely friction and/or agreement may be determined based on an analysis of behavioral (personality, proficiency, communication, etc.) categories that were determined from the submitted behavioral assessments.

Figure 7:
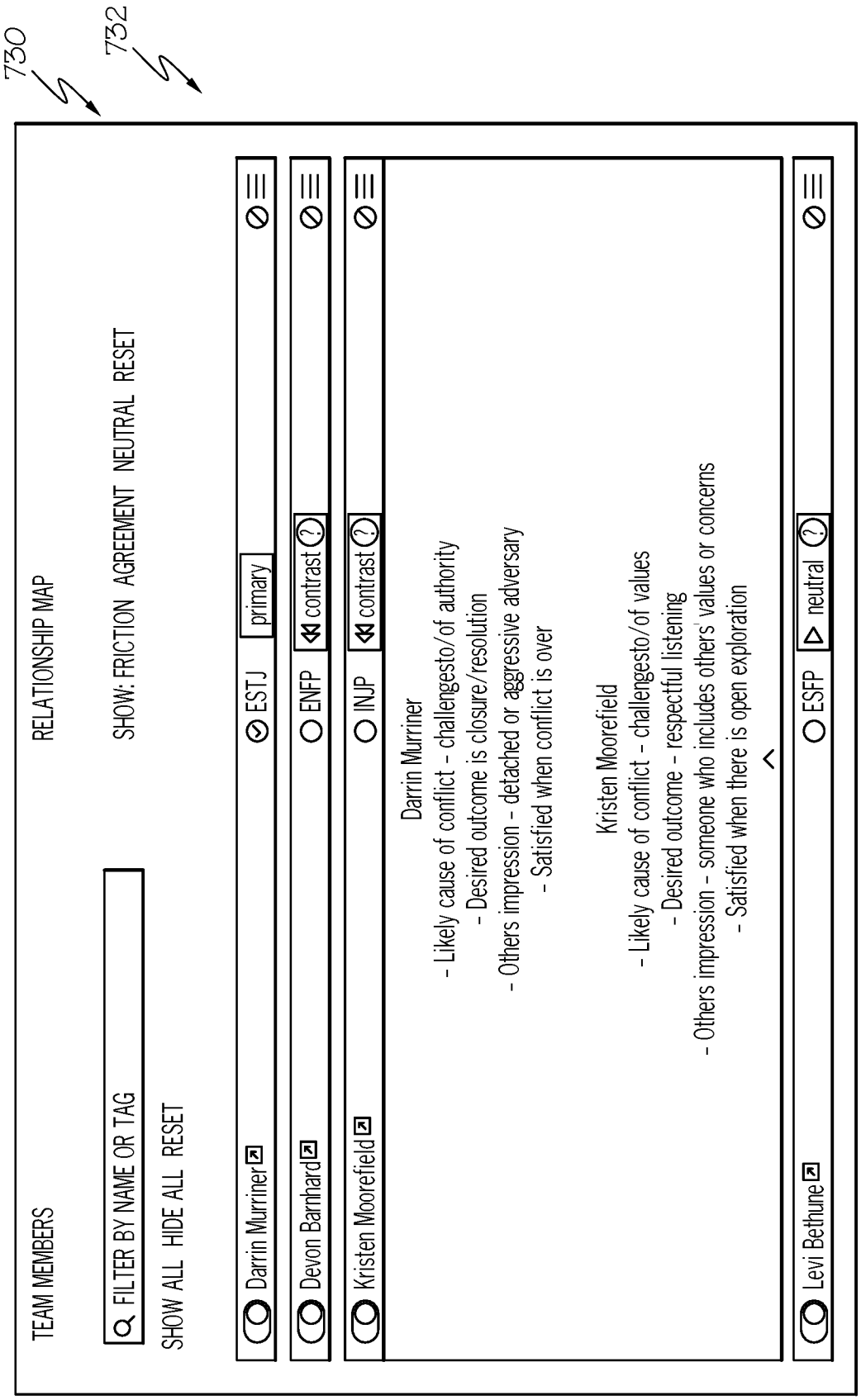
FIG. 7 depicts a user interface for expanding on the relationship map, according to embodiments described herein.

FIG. 7 depicts a user interface 730 for expanding on the relationship map, according to embodiments described herein. Embodiments described herein may be configured to calculate a relationship map that indicates relationships among team members of the first team based on relationship criteria. The relationship criteria may include friction, agreement, neutral, and/or other relationship criteria. As such, the window 732 illustrates reasons that the remote computing device 106 determined that friction, agreement, etc. are likely between two team members. Based on the behavioral assessments and/or behavioral characteristics derived therefrom, a determination may be made regarding whether any two people on a team are likely to find conflict, agreement, or be neutral. The comparison may be performed from an overall behavioral characteristic from a compilation of two or more behavioral assessments and/or may be derived from a single behavioral assessment.

Figure 8:
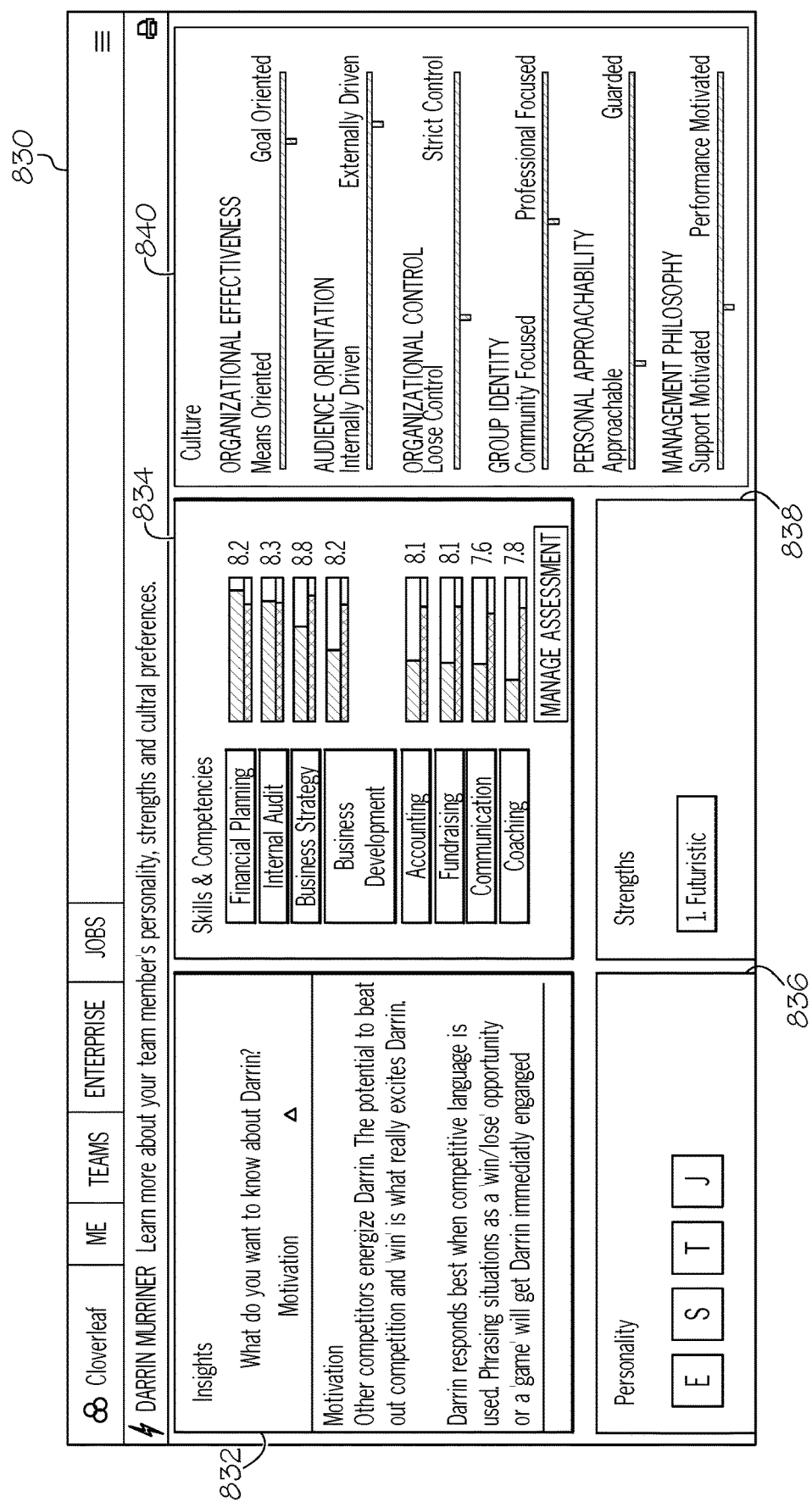
FIG. 8 depicts a user interface for providing individual insights, according to embodiments described herein.

FIG. 8 depicts a user interface 830 for providing individual insights, according to embodiments described herein. Specifically, the user interface 830 allows the user to drill down further on underlying behaviors and how to tailor that person's approach to the individual that is provided in the user interface 830. Specifically, while the user interfaces 330 (FIG. 3), 430 (FIG. 4), and 530 (FIG. 5) are directed to a person reviewing their own information, the user interface 830 may be provided for a user to review another person's information. As such, the user interface 830 includes an insights section 832, a skills section 834, a personality section 836, a strengths section 838, and a culture section 840. While in some embodiments, this may be the same information provided in the user interface 330 (FIG. 3), some embodiments may be configured to filter some of this information, depending on a predetermined access level of the user viewing the information. As an example, a superior may be granted access to see all of a person's information while a peer or someone reporting to the person may only be able to see a portion of the information.

Figure 9:
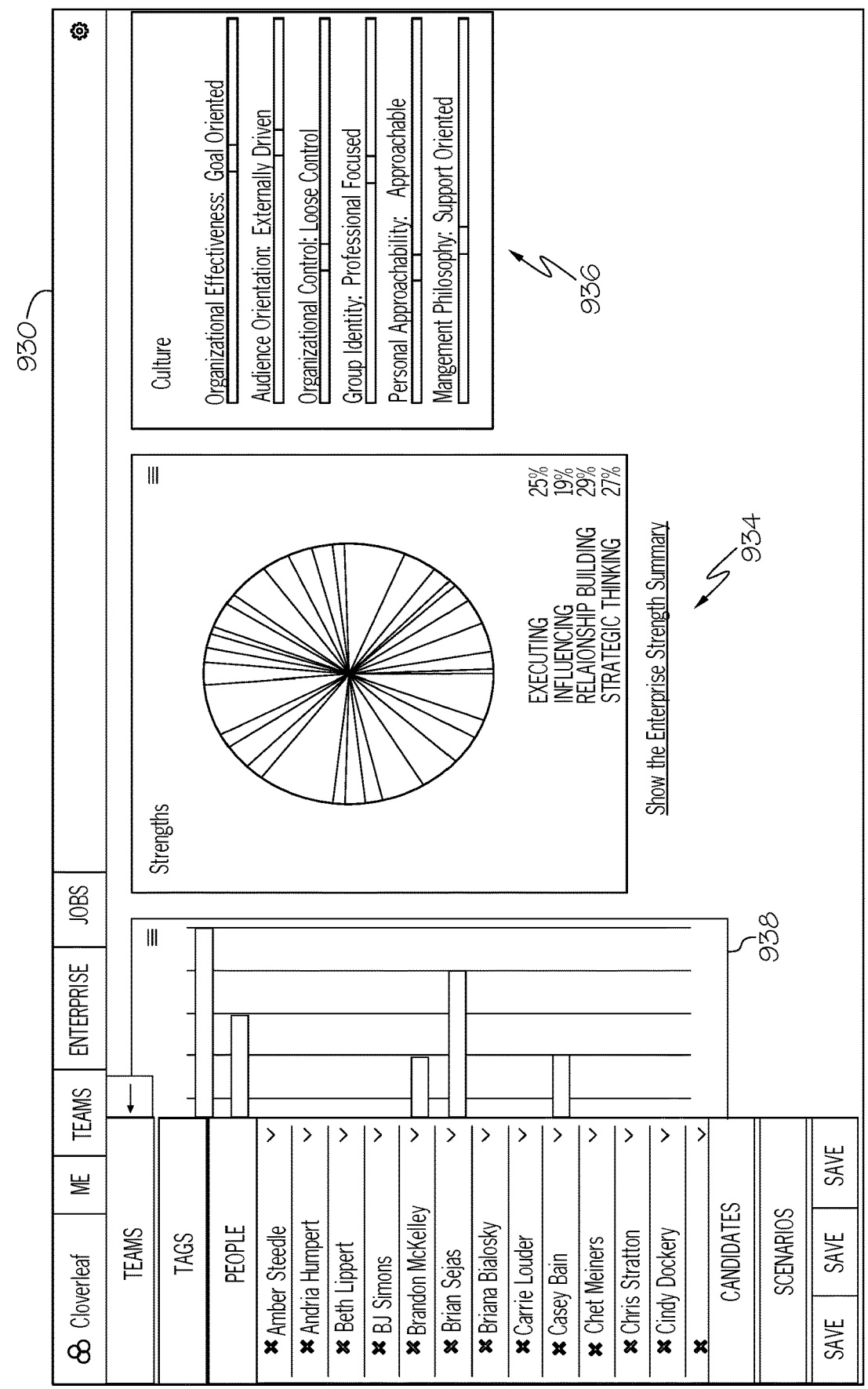
FIG. 9 depicts a user interface for graphically depicting enterprise behavioral data regarding team members, according to embodiments described herein.

FIG. 9 depicts a user interface 930 for graphically depicting enterprise behavioral data regarding team members, according to embodiments described herein. As illustrated, a user may create teams, tags, and/or roles for enterprise members. As an example, a user may create the tags "java," "UI/UX," etc. and may assign those tags to the enterprise members that have experience with Java™ and user interface/user experience, respectively. The user may additionally assign enterprise members to teams to determine which teams fulfill the objectives set by the user. These scenarios may then be saved for later retrieval. It should be noted that in some embodiments, the system may provide reporting to enterprise users on how their employees are using the platform and the value they are getting from using the system.

Accordingly, the user interface 930 may include a people section 932, a strengths section 934, a culture section 936, and a skills section 938. In the people section 932, the user may define teams, tags, and/or people that are on the selected team. Candidate team members may be added to determine how the behavioral characteristics of the candidate affect the team and/or team members. A user may also be provided with an option to create and/or implement scenarios to determine under which situations the behavioral characteristics of team members (or candidate team members) will affect the team.

In the strengths section 934, the selected information from the people section 932 may be graphically depicted to show the strengths of the team overall and/or for particular scenarios. In the culture section 936, team culture information may be provided overall and/or for particular scenarios. In the skills section 938, skills of the people and/or team may be provided.

Figure 10:
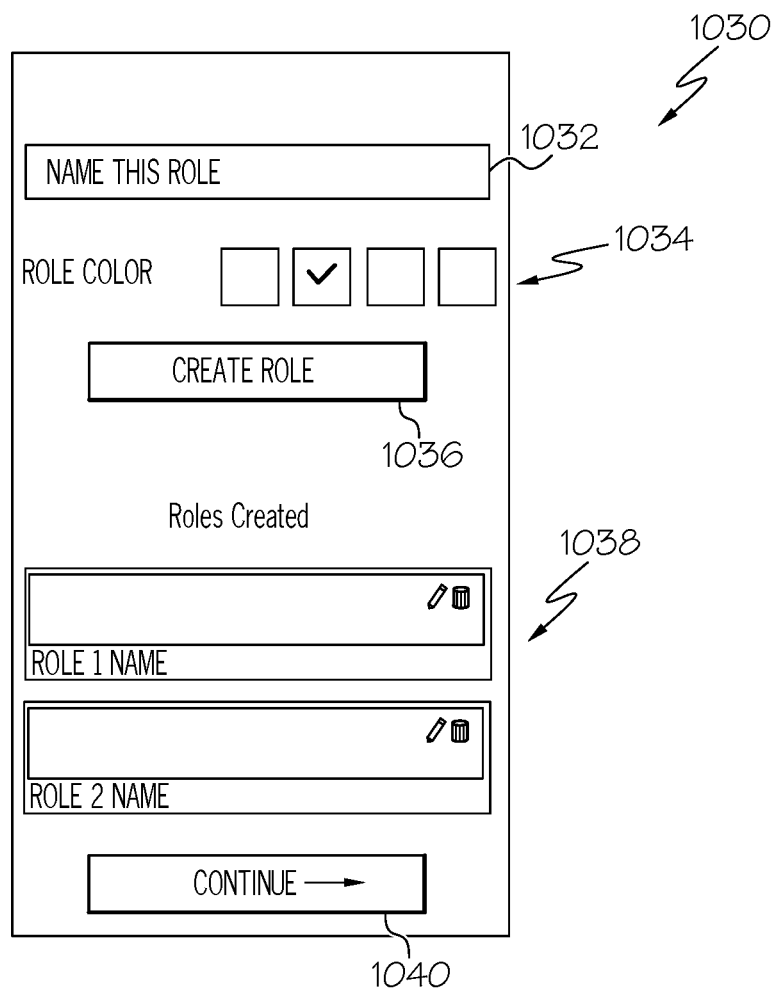
FIG. 10 depicts a user interface for creating team roles, according to embodiments described herein.

FIG. 10 depicts a user interface 1030 for creating team roles, according to embodiments described herein. As illustrated, a user may create team roles for different team members. As illustrated, the user interface 1030 may include a name field 1032, a color field 1034, a create option 1036, a roles section 1038, and a continue option 1040. Specifically, a user may create a new role by populating the name field 1032, selecting a color for the role in the color field 1034, and selecting the create option 1036. In the roles section 1038, existing roles may be provided. Once the user has finished, the user may select the continue option 1040.

Figure 11:
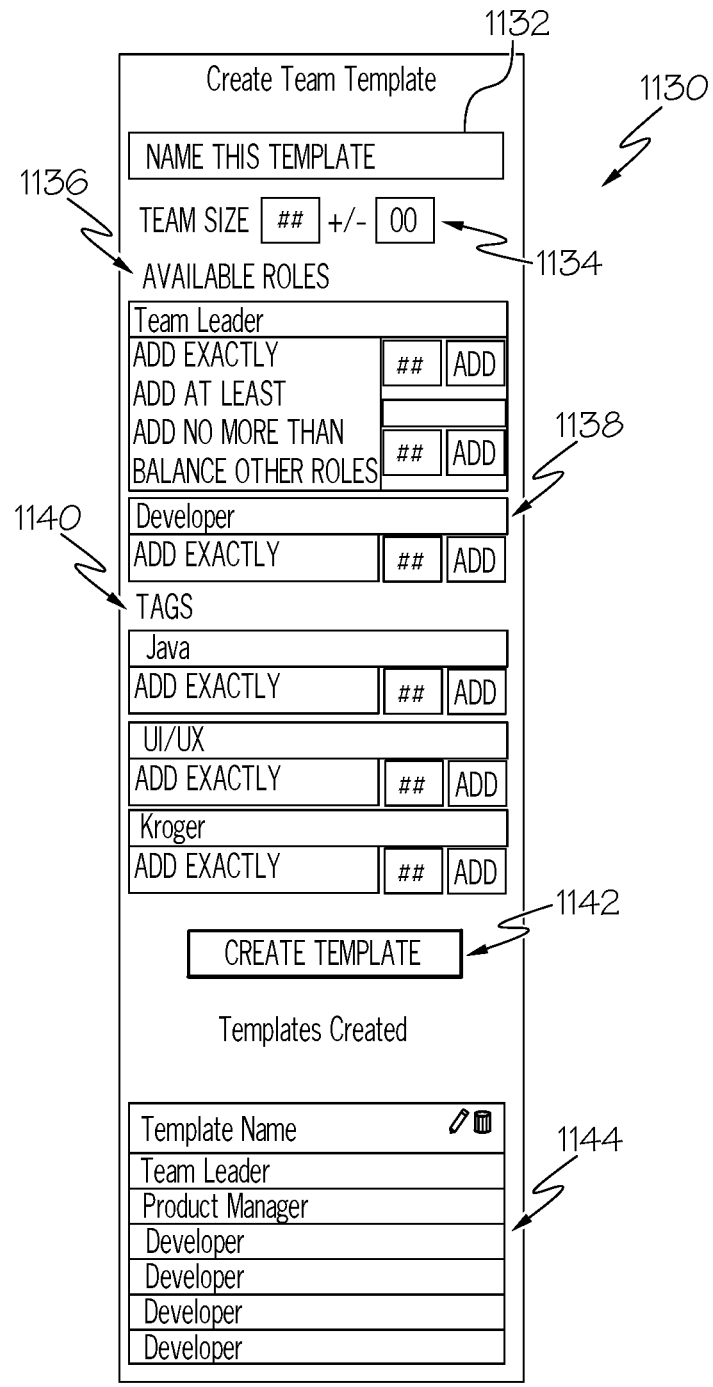
FIG. 11 depicts a user interface for creating a team template, according to embodiments described herein.

FIG. 11 depicts a user interface 1130 for creating a team template, according to embodiments described herein. As illustrated, the user may create a team template, which may include a team size, roles (such as created in the user interface 1030 from FIG. 10), and tags that are desired for team members. As illustrated, the user interface 1130 may include a name field 1132, a team size option 1134, a team leader option 1136, a developer option 1138, a tags option 1140, and a create template option 1142. Created templates may be provided in the templates section 1144. To create a new template, the user may populate the name field 1132, populate the team size option 1134, select a team leader with the team leader option 1136, select a developer with the developer option 1138, select tags with the tags option 1140, and select the create template option 1142.

Figure 12:
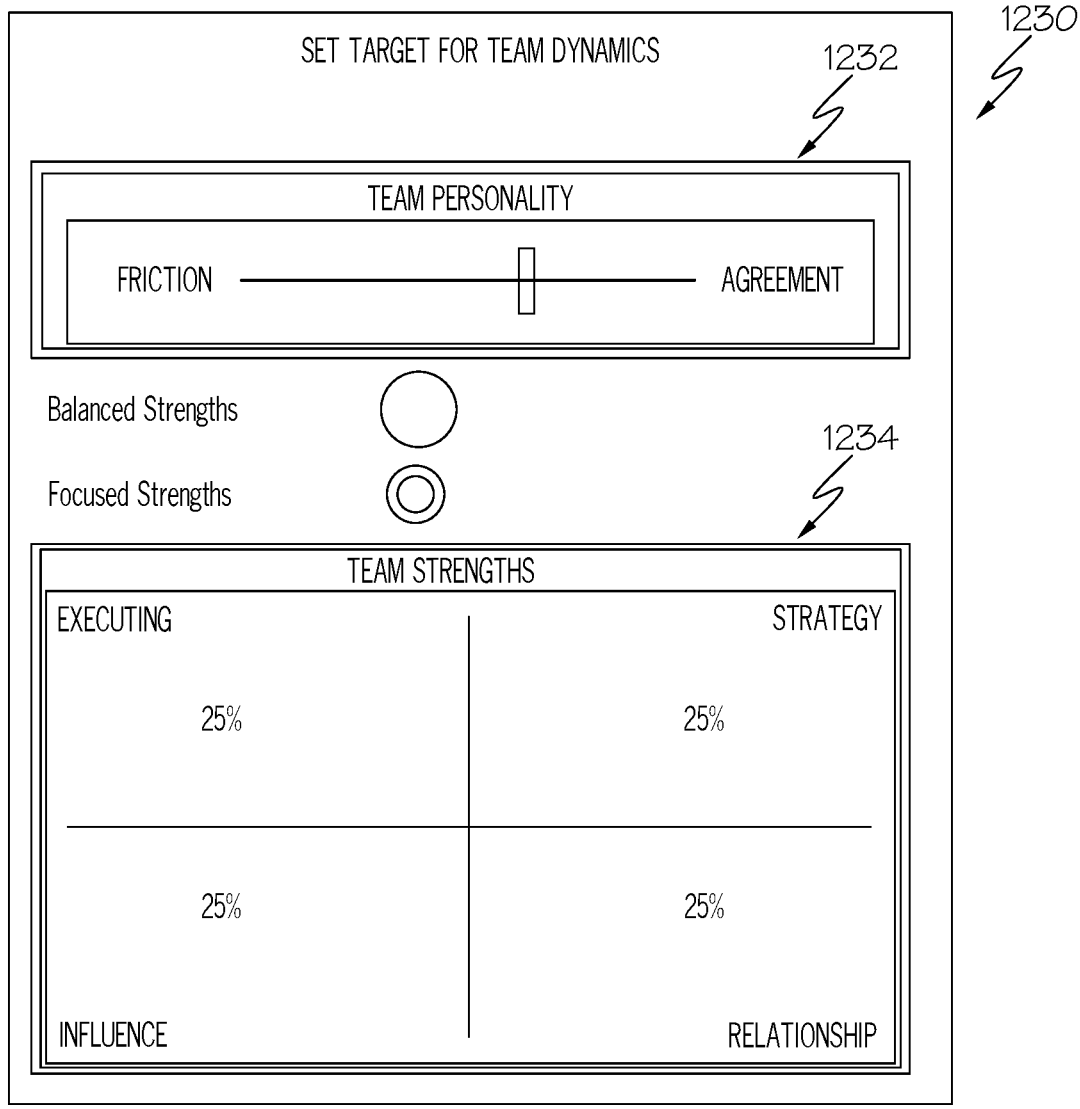
FIG. 12 depicts a user interface for setting target team dynamics, according to embodiments described herein.

FIG. 12 depicts a user interface 1230 for setting target team dynamics, according to embodiments described herein. Specifically, the user may select the desired behavioral characteristics for a team, such as executing, influence, strategy, and relationship. As illustrated, the user interface 1230 may include a team personality section 1232 for the user to determine a level of friction and/or agreement with the team. Team strengths may be defined in team strengths section 1234 by adjusting the vertical and horizontal lines (thereby reducing the area of any given section) and/or by dragging and dropping balanced strengths and focused strengths into the team strengths section 1234.

Figure 13:
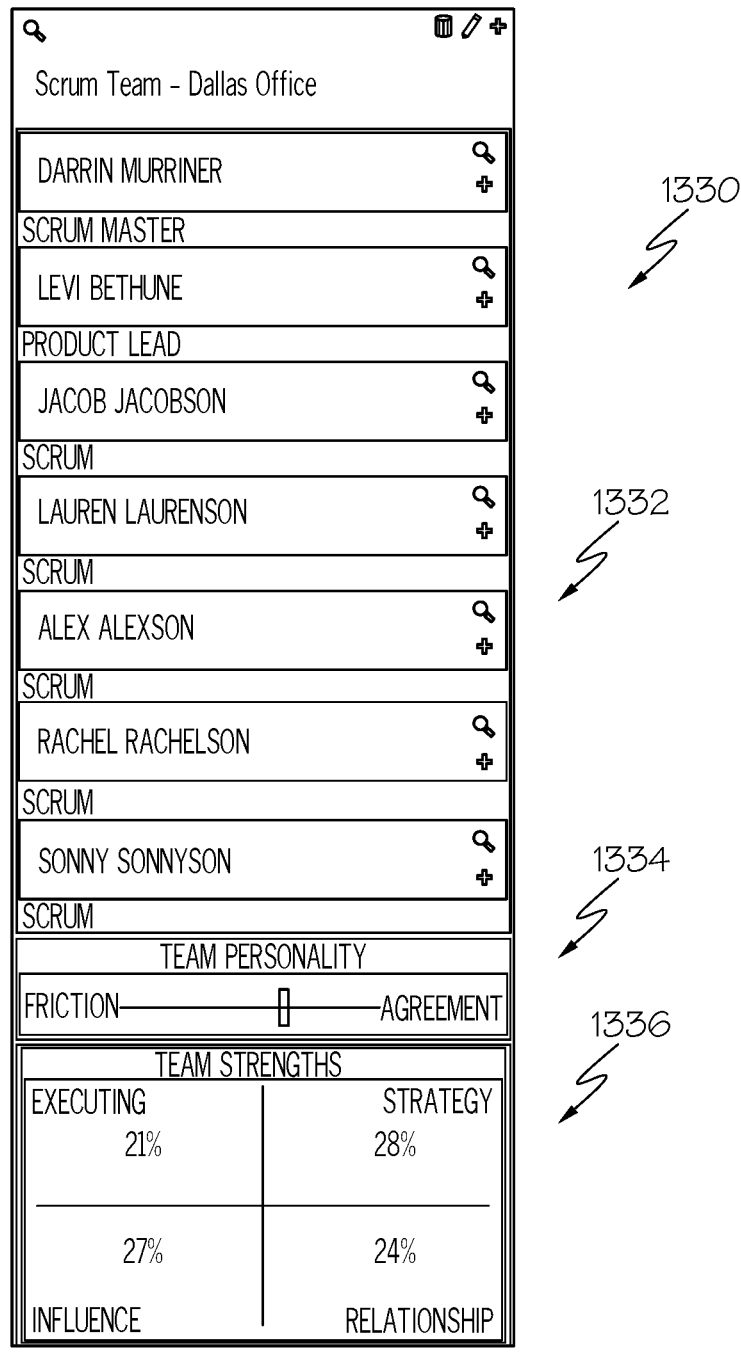
FIG. 13 depicts a user interface for determining team members according to a target team dynamic, according to embodiments described herein.

FIG. 13 depicts a user interface 1330 for determining team members according to a target team dynamic, according to embodiments described herein. From the desired dynamics and the available enterprise members, the remote computing device 106 may select the desired team. Specifically, embodiments described herein may compile the behavioral characteristics as calculated from the plurality of different behavioral assessments and receive the team dynamics defined in the user interface 1230 (FIG. 12). With this information, these embodiments may determine a team from a pool of candidate people that will demonstrate the desired team dynamics. As such, the user interface 1330 may provide a listing of those selected team members in the members section 1332, a team personality option 1334 to adjust the desired team personality, and a team strengths option 1336 to adjust the desired team strengths.

Figure 14:
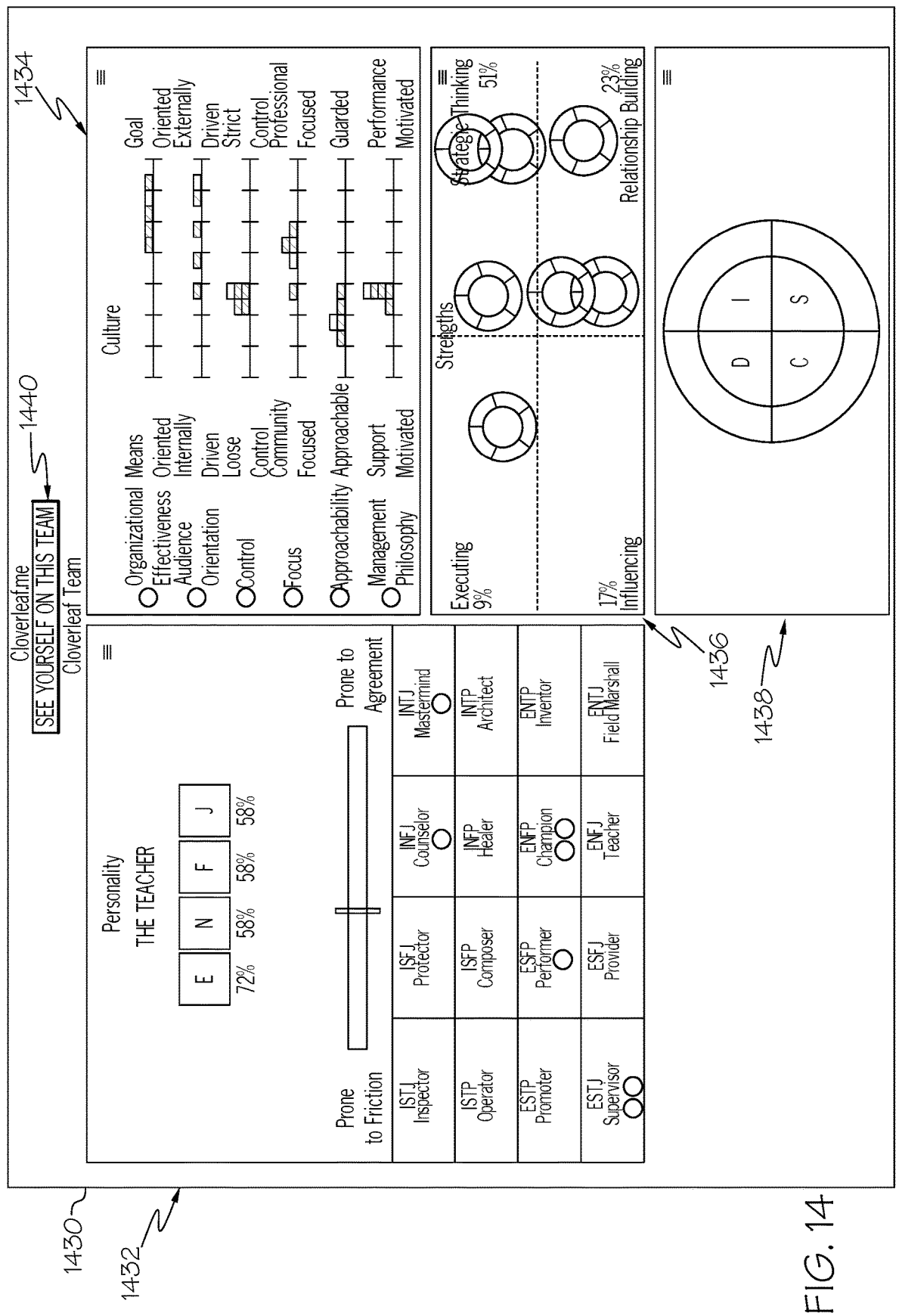
FIG. 14 depicts a user interface for providing an anonymous public assessment data for a team, according to embodiments described herein.

FIG. 14 depicts a user interface 1430 for providing an anonymous public assessment data for a team, according to embodiments described herein. As illustrated, a first user may be a manager who is looking for a new team member. Thus, the first user may create the user interface 1430 with the existing team members, which includes a personality section 1432, a culture section 1434, a strengths section 1436, and an interpersonal section 1438. This dashboard may be stripped of identifying characteristics of individual team members, such that the user interface 1430 may be published to a second user. Also included is an insert me option 1440 for the second user. In response to selection of the insert me option 1440, the remote computing device 106 may insert the second user's behavioral data into the user interface 1430 for determining how the second user fits in the team.

Figure 15:
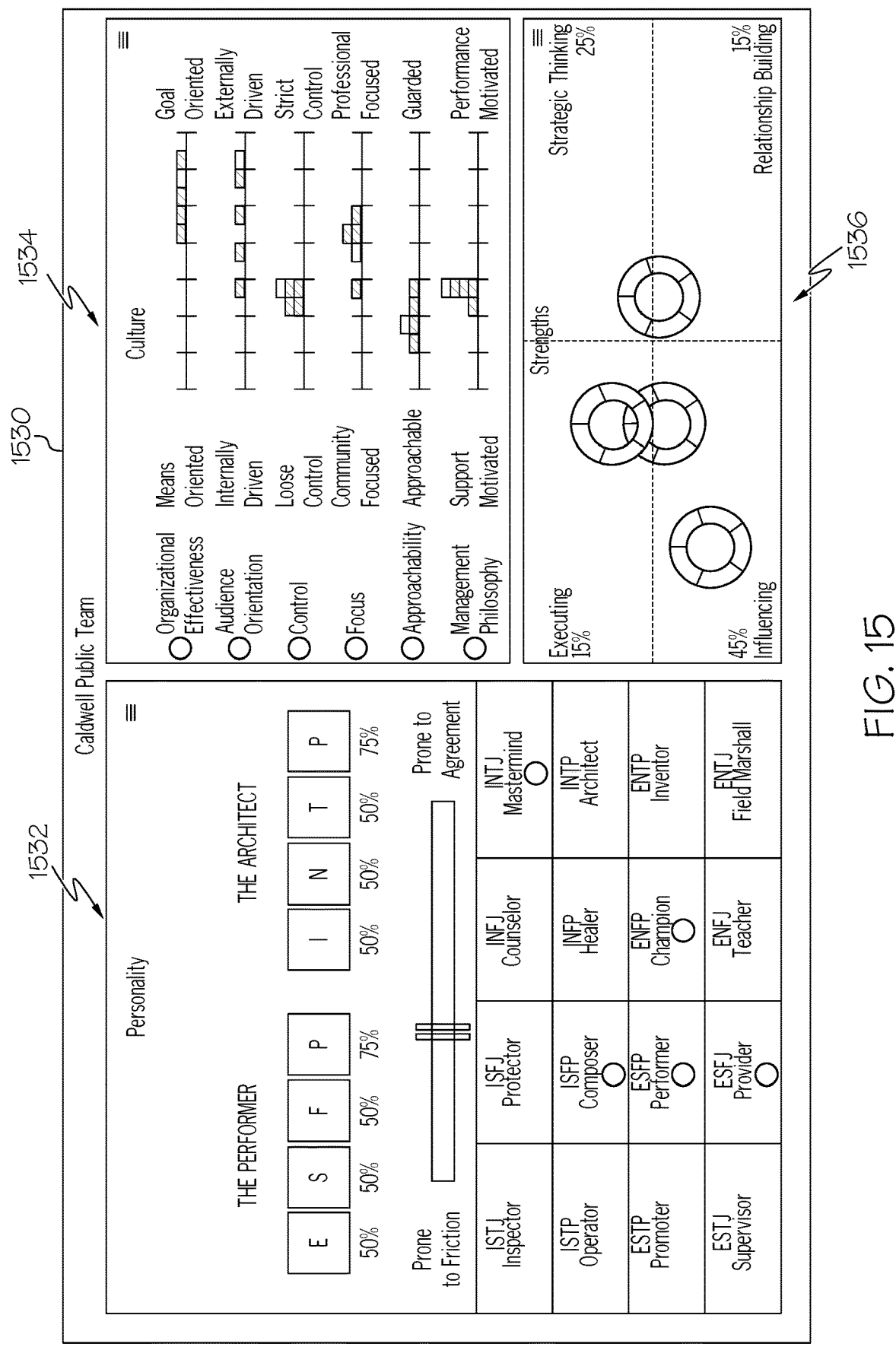
FIG. 15 depicts a user interface for providing a user superimposed into team data, according to embodiments described herein.

FIG. 15 depicts a user interface 1530 for providing a user superimposed into team data, according to embodiments described herein. In response to selection of the insert me option 1440 from FIG. 14, the remote computing device 106 superimposes a user's behavioral characteristics onto the user interface 1430 from FIG. 14 and presents the interface as user interface 1530. As such, the user interface 1530 includes a personality section 1532, a culture section 1534, a strengths section 1536, and/or other desired behavioral sections.

FIG. 16 depicts a user interface 1630 for providing behavioral data associated with meeting participants, according to embodiments described herein. In response to setting a meeting, receiving a communication, etc. the user computing device 102 may provide a behavioral assessment of the other party to the communication. The behavioral assessment may be context dependent, meaning that if it is determined that the communication relates to job opening, the user may receive performance and/or personality information. If it is determined that the communication relates to a social event, different information may be provided. Some embodiments may be static in that the same information is provided, regardless of context.

FIG. 17 depicts a user interface 1730 for providing communication details associated with a recipient of an electronic communication, according to embodiments described herein. In addition to the information about the other party to the conversation, the remote computing device 106 (and/or user computing device 102) may provide at least one actionable insight on the other person, such as motivation, resolving conflict, personal development, leadership development, persuasion, and/or the like, based on their behavioral analysis.

Figure 18:
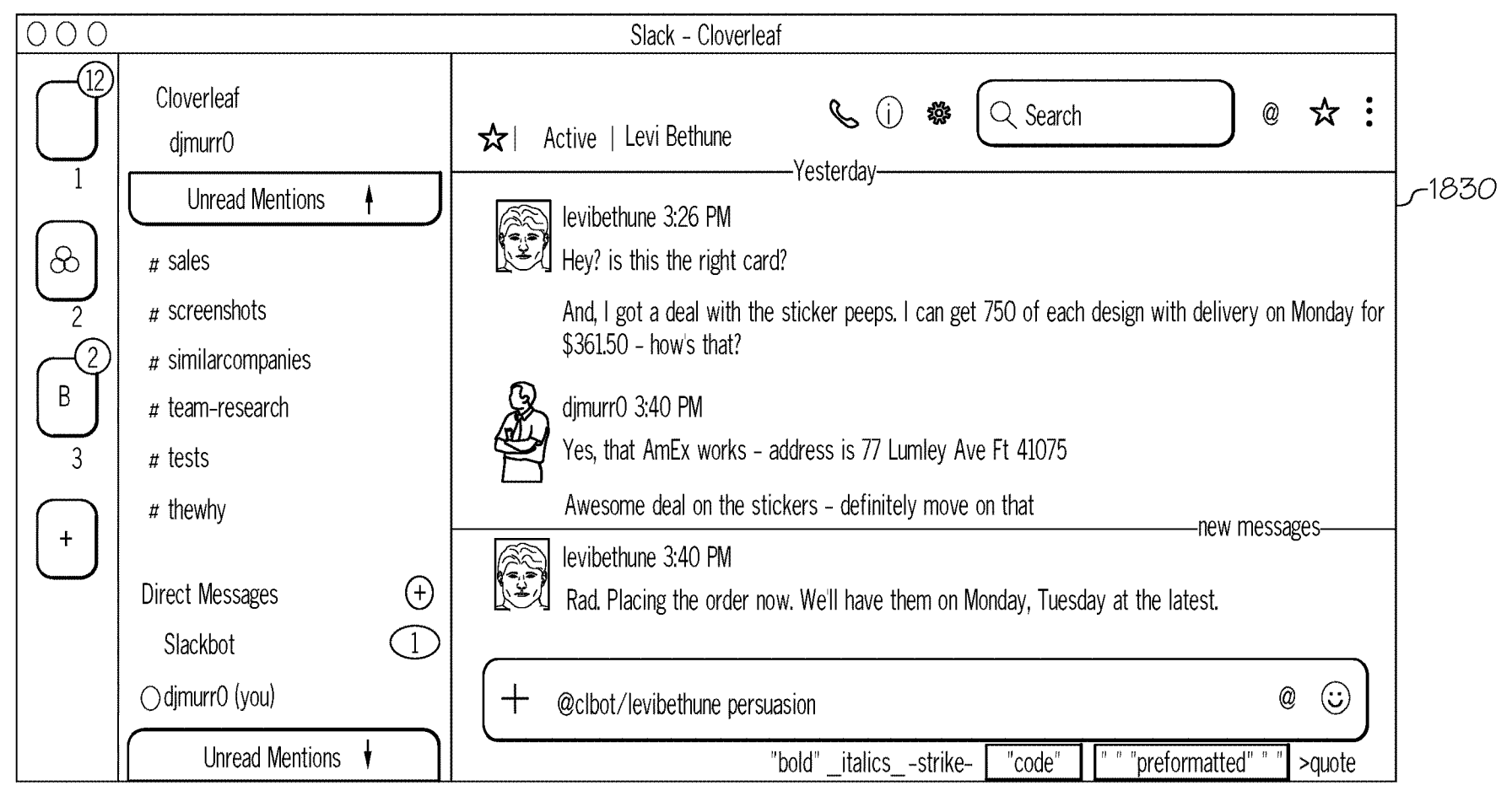

FIG. 18 depicts a user interface 1830 for providing communication details associated with a recipient of an electronic communication, according to embodiments described herein. The electronic communication may be made through commands entered in team messaging apps such as Slack or Microsoft Teams. In addition to the information about the other party to the conversation, the remote computing device 106 may provide recommendations on how to communicate with that other party, based on their behavioral analysis including factors such as persuasion, motivations or work style.

It should be understood that while some embodiments may provide an abbreviated version of the data provided in previous user interfaces in the electronic communication and/or calendar, this is merely an example. Some embodiments may provide options to see the full dashboard and/or provide the full dashboard automatically.

Figure 19:
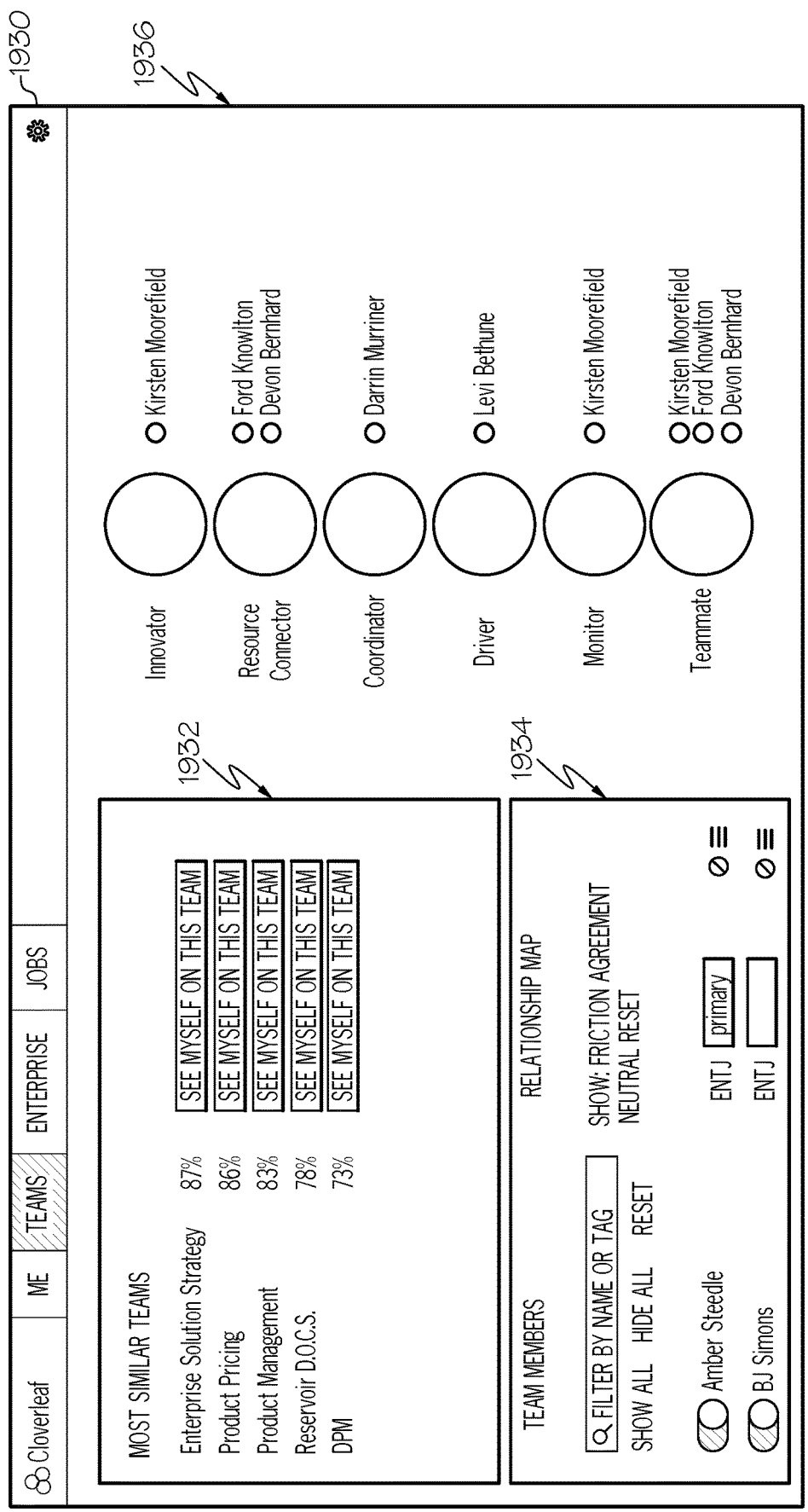
FIG. 19 depicts a user interface for providing recommendations for team roles, according to embodiments described herein.

FIG. 19 depicts a user interface 1930 for providing recommendations for team roles, according to embodiments described herein. As illustrated, the user interface 1930 may include a most similar teams window 1932, a relationship map 1934, and a recommendation window 1936, which provides recommendations for various roles. These team role recommendations are formed by cross mapping behavioral data provided by the psychometric assessments and skill data provided by each user in context to the other users on the team. These recommendations may be refined over time using machine learning to determine which roles are best for the users depending on how other team users have responded to these recommendations and based on the unique mix of people on each team.

Figure 20:
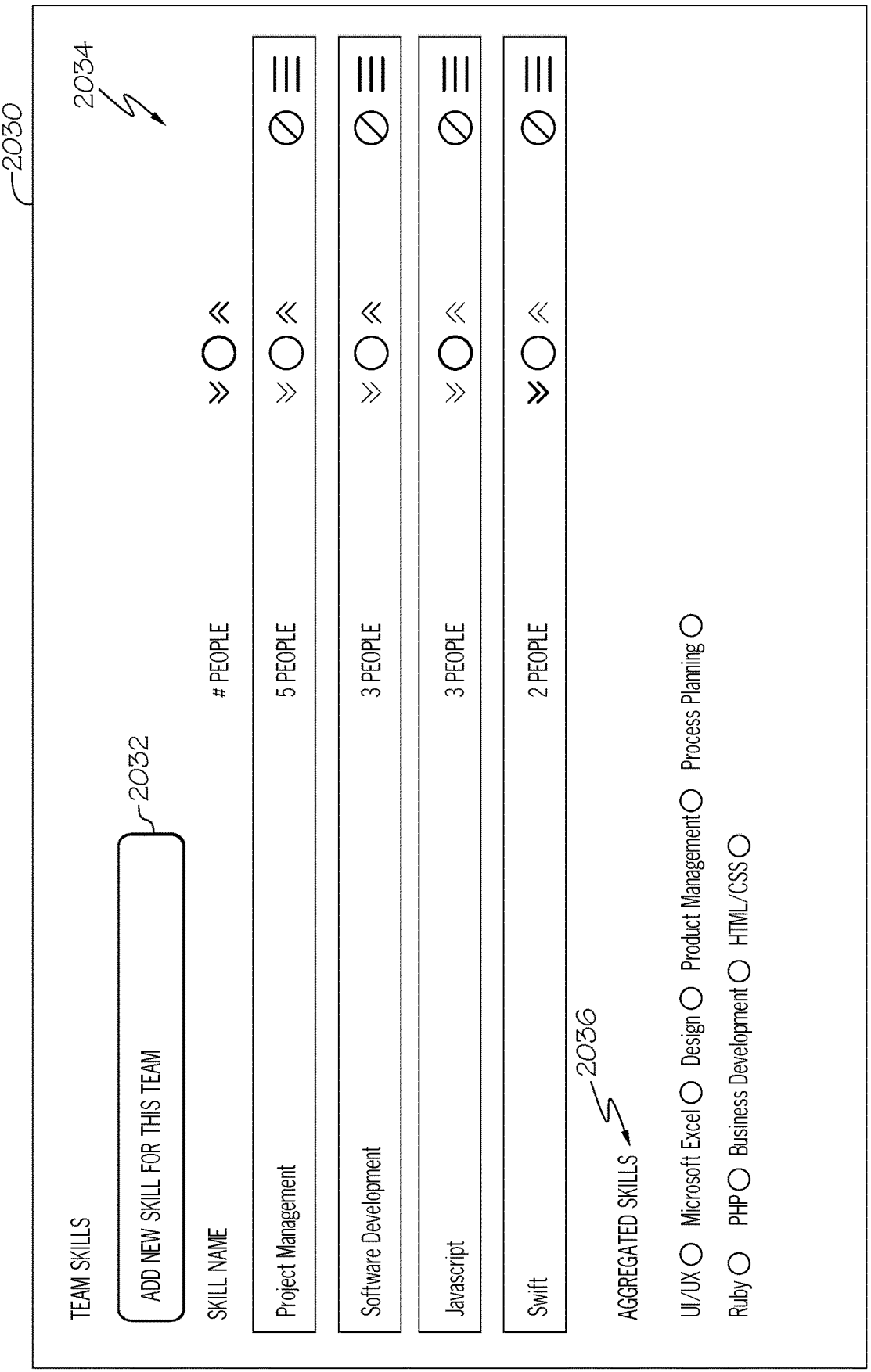
FIG. 20 depicts a user interface for providing team skills, according to embodiments described herein.

FIG. 20 depicts a user interface 2030 for providing team skills, according to embodiments described herein. As illustrated, an add option 2032 may be provided for adding a new skill for the team. The skills may be added as being important for a particular team and may be ranked in order of importance. Thus, when recommending people to a team, these skill criteria may be utilized in making that recommendation. It should be noted that individual skill ratings may be provided aggregating these skills at the team level so the team leader can identify the level of capabilities around these skills and/or competencies to better refine the selection criteria for the fit of new users to the team. Accordingly, a skill section 2034 may provide the created skills with options for deleting and reordering the listed skills. An aggregated skills section 2036 may also be provided for adding commonly used skills to the team.

FIG. 21 depicts a user interface 2130 for providing skills and competencies, according to embodiments described herein. As illustrated, the user interface 2130 includes a skill section 2132 for a user to add one or more skills to a profile and rate those skills. Once the skill section 2132 is complete, the user may select a done option 2134. As such, embodiments described herein provide a mechanism for users to identify their top skills and competencies and to provide a rating on those skills/competencies from beginner to expert status. Managers and other team members may also be provided with an option to rate each of these skills of the user, providing a 360 degree view of these capabilities. In some embodiments, this data that may also be aggregated on the team dashboard and used for finding team fit.

Figure 22:
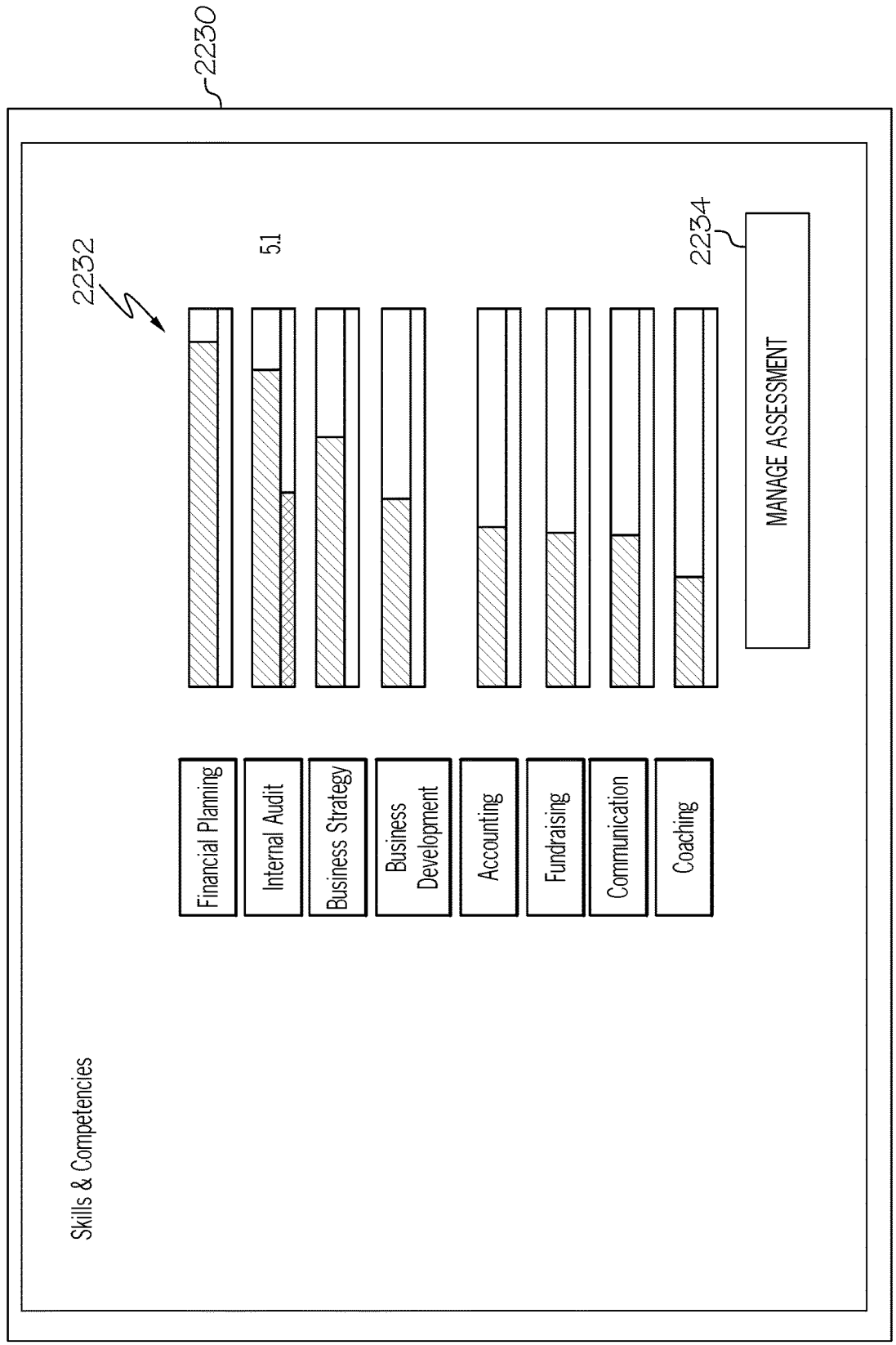
FIG. 22 depicts a user interface for providing a graphical representation of skills and competencies, according to embodiments described herein.

FIG. 22 depicts a user interface 2230 for providing a graphical representation of skills and competencies, according to embodiments described herein. As discussed above, while a user may select and rate their own skills, the user interface 2230 may be provided to a manager for managing the user's self-assessment. As such, the user interface 230 includes an assessment section 2232 that provides the user's self-assessment. A manage assessment option 2234 is provided for the manager to provide comments and/or edit that assessment.

FIG. 23 depicts a user interface 2330 for providing a development plan, according to embodiments described herein. Specifically, embodiments described herein may provide a user with the ability to create goals or development plans throughout in a way that specifically connects team development to individual development. As illustrated, the user interface 2330 may provide a name field 2332, a description field 2334, a training field 2336, a support field 2338 and a measurement field 2340. Depending on the embodiment, a user may populate these fields for themselves. Some embodiments may provide an option for a manager or other third party to populate one or more of the fields for another person.

FIG. 24 depicts a user interface 2430 for identifying candidate fit, according to embodiments described herein. Specifically, the user interface 2430 may provide data associated with job openings and applicants to those job openings. As illustrated, the user interface 2430 may provide a company field 2432, a job title field 2434, a customer field 2436, a payment status field 2438, a connected teams field 2440, and applicants field 2442, a validity field 2444, and a status field 2446. Specifically, the company field 2432 may provide the company that has the job opening. The job title may provide the title of the job that has the opening. The customer field 2436 may provide a customer associated with the job opening. The connected teams field 2440 may list the teams with which the job is associated. The applicants field 2442 may indicate the current number of applicants that have applied for the job. The validity field 2444 provides the duration that the job will be advertised. The status field 2446 may provide whether the job opening advertisement is active or inactive.

FIG. 25 depicts a user interface 2530 for providing job details associated with a candidate, according to embodiments described herein. As illustrated, a user may create a new job opening and/or edit an existing job opening from the user interface 2430 from FIG. 24. As such, the user interface 2530 may include an administrators field 2532 for viewing and/or editing the administrators to the job opening. A position field 2534 may be populated with the job opening position. A job alias field 2536 may provide a further description of the job opening. An industry field 2538 may receive an industry for the job opening.

A sponsor field 2540 may receive data regarding whether the job opening is sponsored and will thus appear at a more prominent location. An application option 2542 may be provided for a user to indicate how to apply for the job opening. A validity field 2544 may receive information on a time period for the job posting. A status field 2546 may receive an indication of whether the job posting is active or inactive. A company field 2548 may receive a company name of the entity that is providing the job. A company description field 2550 may receive a description of the company offering the job. A city field 2552, a state field 2554, a country field 2556, and a zip field 2558 may receive location information regarding the job. A connected teams field 2560 may receive teams that are connected to the job opening. Also provided are an applicants option 2562 and an orders option 2564, described in more detail below.

Figure 26:
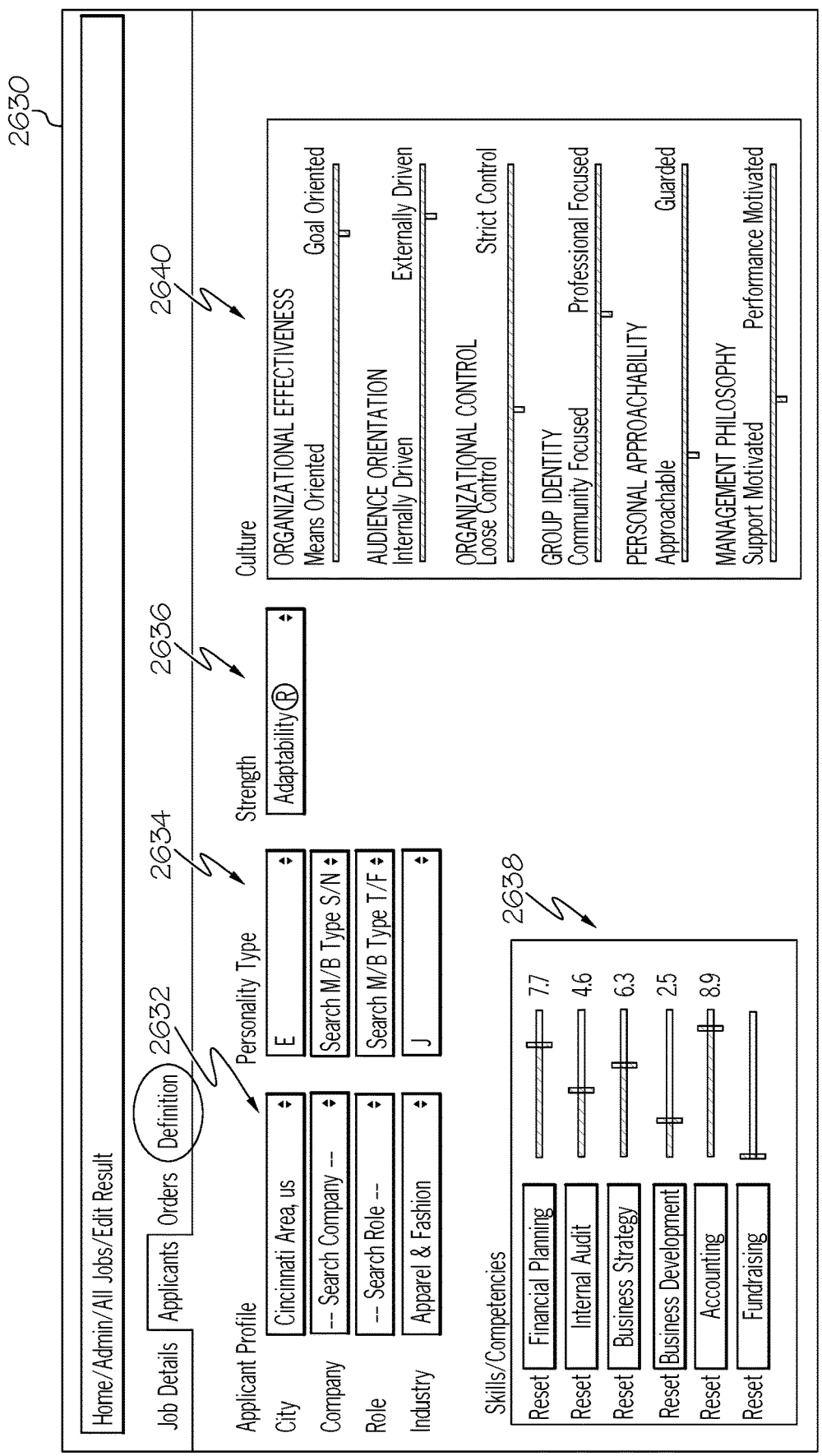
FIG. 26 depicts a user interface for viewing a candidate assessment details, according to embodiments described herein.

FIG. 26 depicts a user interface 2630 for viewing a candidate assessment details, according to embodiments described herein. In response to selection of the applicants option 2562 from FIG. 25, the user interface 2630 may be provided. As illustrated, the user may define one or more desired behavioral characteristics for job candidate. As illustrated, the user interface 2630 may include a profile section 2632, a personality section 2634, a strength section 2636, a skills section 2638, and a culture section 2640. Accordingly, the user may define a desired applicant profile in the profile section 2632. The user may provide the desired behavioral characteristics in the personality section 2634. The user may select a desired strength characteristic in the strength section 2636. The user may select desired skills and/or competencies in the skills section 2638. The user may define desirable culture characteristics of the job applicant in the culture section 2640. Embodiments may also provide options to add a new person to the comparison and/or delete an existing person from the comparison.

Figure 27:
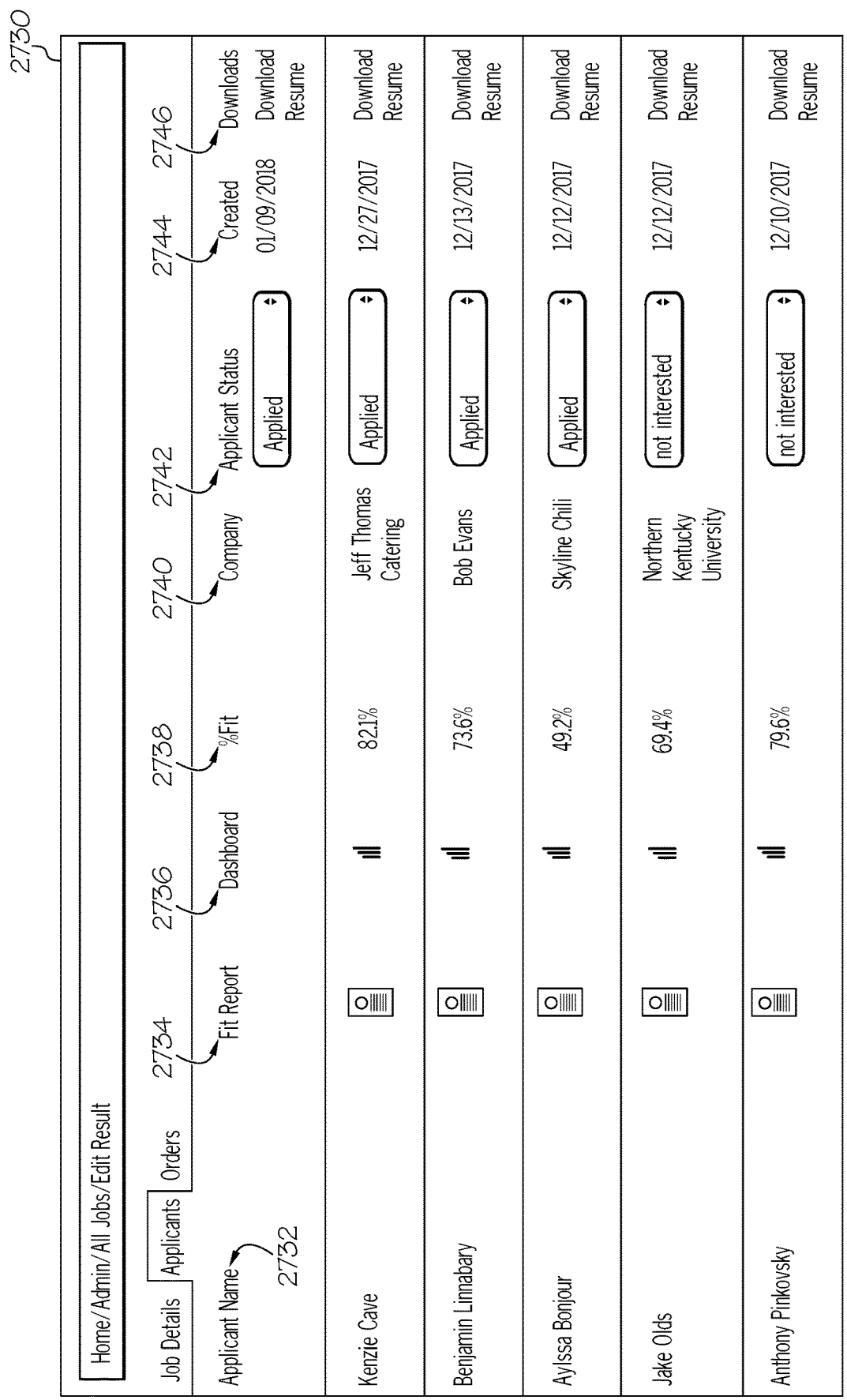
FIG. 27 depicts a user interface for providing a list of possible applicants, according to embodiments described herein.

FIG. 27 depicts a user interface 2730 for providing a list of possible applicants, according to embodiments described herein. As illustrated, the user interface 2730 may provide a name field 2732 for listing applicants for a selected job opening. A report field 2734 may provide one or more fit reports for the applicant, based on the applicants behavioral assessments compared with the desirable behavioral characteristics defined in the user interface 2630 (FIG. 26).

A dashboard field 2736 may provide the corresponding behavioral characteristics dashboard of the job applicants. A fit field 2738 may provide a metric of how well the applicant fits for the job. Specifically, embodiments may utilize a proprietary algorithm to weight matches of applicant behavioral characteristics with the desired behavioral characteristics, thereby identifying a ranking of candidates. A company field 2740 may provide the company that is offering the job. A status field 2742 provides a status of the applicant to the job opening. In some embodiments, the user may alter this status, based on changes in the applicant's situation (declined, applied, not interested, etc.). A created field 2744 provides a data when the job posting was created, and a downloads field 2746 may provide options to download a resume and/or other data related to the job applicant.

Figure 28:
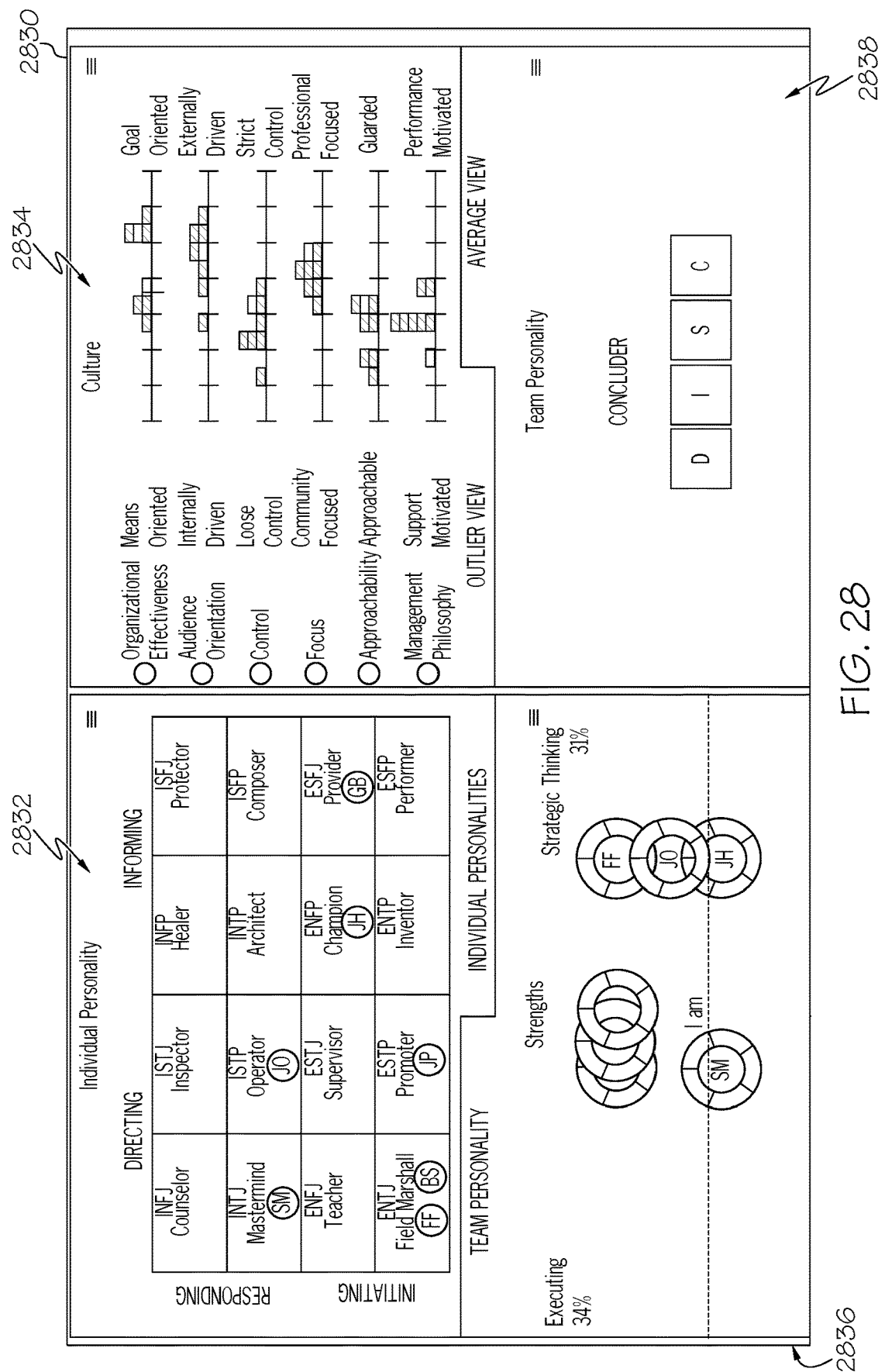
FIG. 28 depicts a user interface for providing a dashboard of personalities for a possible new team member, according to embodiments described herein.

FIG. 28 depicts a user interface 2830 for providing a dashboard of personalities for a possible new team member, according to embodiments described herein. As illustrated, the user interface 2830 provides an individual personality section 2832, a team personality section 2836, a culture section 2834, and an interpersonal section 2838. Specifically, the user interface 2830 may be configured to compare the job applicant's behavioral characteristics with one or more members of a team for which the job posting is related. As such, embodiments may be configured to determine how a job applicant would fit in the job opening and how the job applicant would interact and fit with team members.

Figure 29:
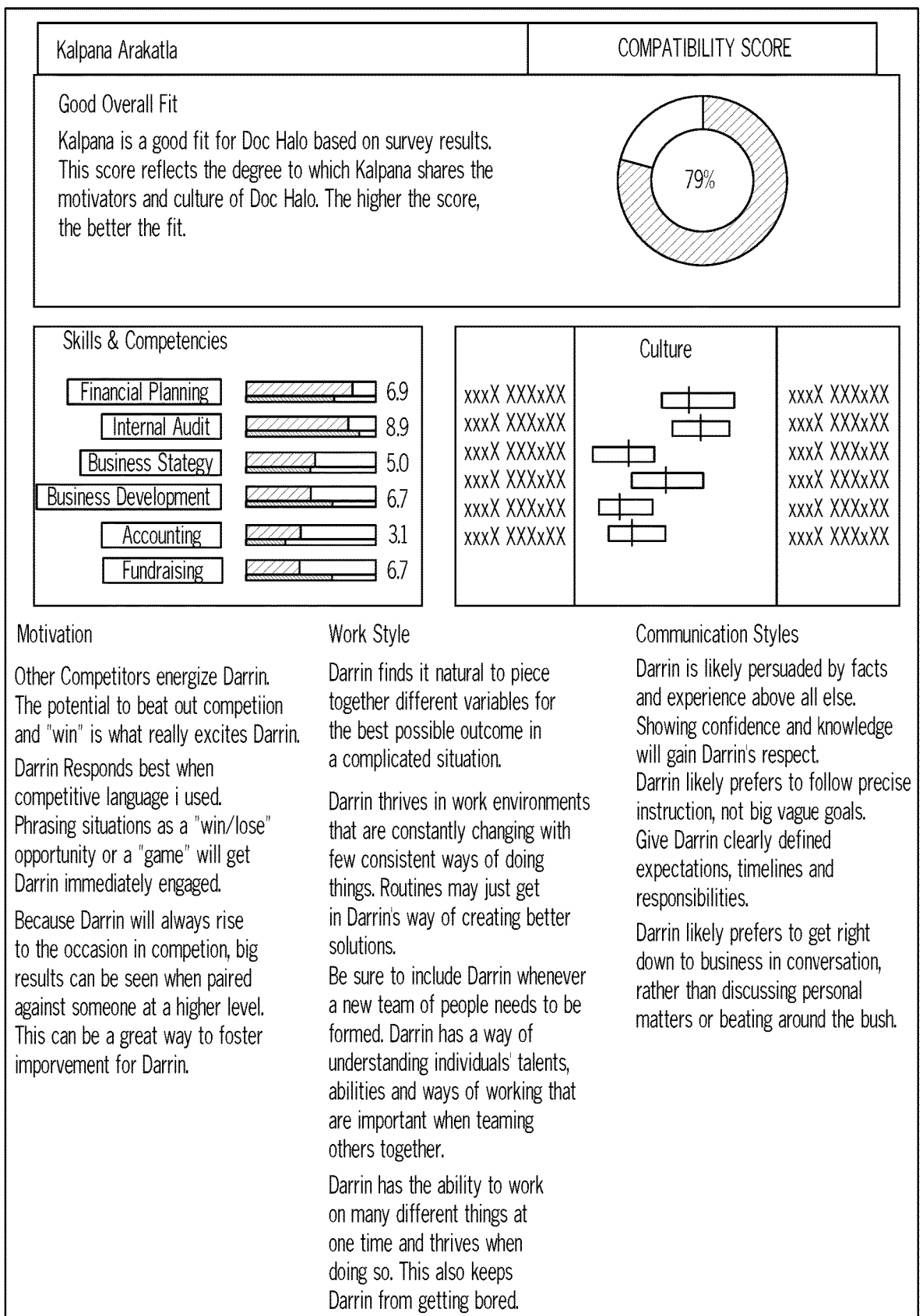
FIG. 29 depicts a user interface for providing a selected candidate, according to embodiments described herein.

FIG. 29 depicts a user interface 2930 for providing a selected candidate, according to embodiments described herein. As illustrated, the user interface 2930 includes a compatibility score for a job applicant across the plurality of behavioral characteristics that the platform measures. This compatibility score relates to how well the job applicant would fit into the team and provides skills, culture, interpersonal characteristics, strengths, etc. as well as motivation, work style, communication style, etc. which may be used by the employer to determine whether to hire this particular job applicant.

Figure 30:
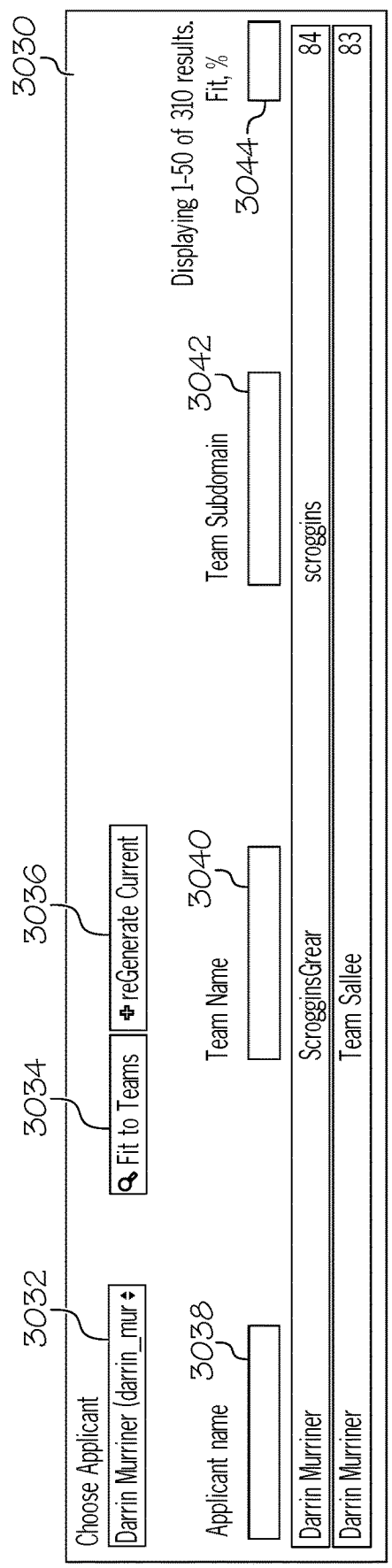
FIG. 30 depicts a user interface for identifying a team that would be a good fit for an existing employee, according to embodiments described herein.

FIG. 30 depicts a user interface 3030 for identifying a team that would be a good fit for an existing employee, according to embodiments described herein. Specifically, embodiments described herein are configured to allow managers and team leaders to identify candidate fit based on various assessments. Leaders may identify (using goal setting) the specific requirements of the job (such as personality types, strengths, skills and proficiencies) and their associated level of skill to determine which candidates are the best fit to the existing team based on the existing combination of team members and the goals of the leader. Using this same data, embodiments may identify teams that would be a good fit for an existing employee or an existing employee that would be a great for an existing team.

As such, the user interface 3030 includes an applicant field 3032, by which a user may designate the applicant. An option 3034 is provided for the user to determine which teams the designated applicant would fit best, based on the behavioral characteristics. A regenerate current option 3036 may also be provided for regenerating assessments for team fit due to changes in team members, etc. Also provided is an applicant search field 3038, a team search field 3040, a subdomain field 3042, and a fit percentage field 3044 by which the user may search from a plurality of listed applicants, teams, and fits. Based on the results of the search, the user may determine which team the applicant best fits.

Figure 31:
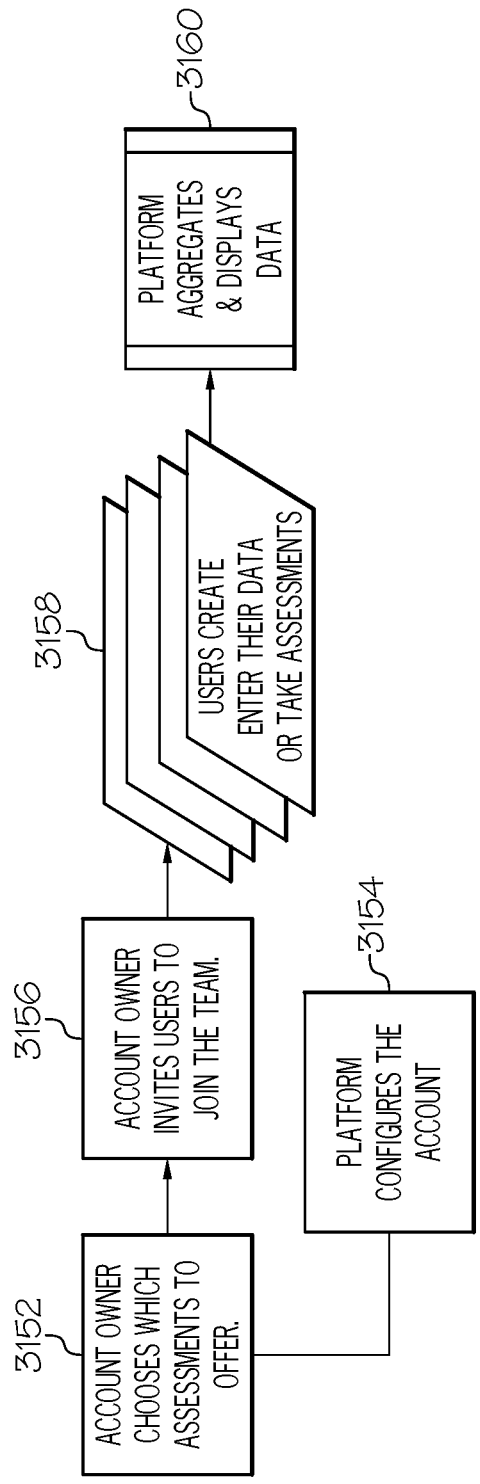
FIG. 31 depicts a flowchart for aggregating assessment data, according to embodiments described herein.

FIG. 31 depicts a flowchart for aggregating assessment data, according to embodiments described herein. As illustrated in block 3152, an account owner may choose which assessment to offer. In block 3154, the remote computing device 106 may configure the account. Additionally, in block 3156, the account owner may invite users to join a team. In block 3158, one or more users may create the account, enter data, and/or participate in the respective behavioral assessments. In block 3160, the remote computing device 106 may aggregate and display the received data.

Figure 32:
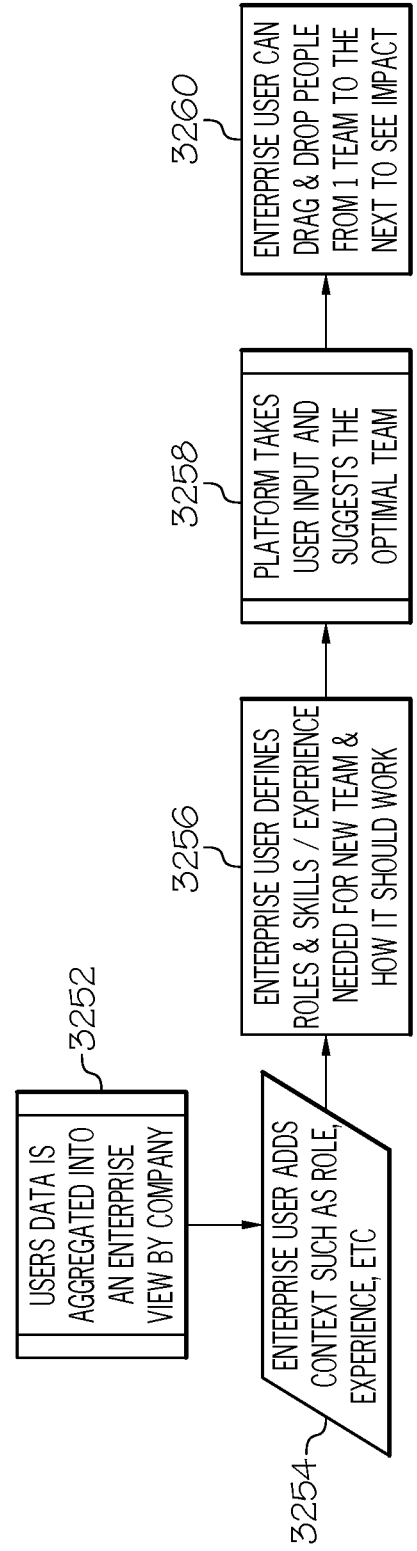
FIG. 32 depicts a flowchart for an enterprise to construct an optimal team, according to embodiments described herein.

FIG. 32 depicts a flowchart for an enterprise to construct an optimal team, according to embodiments described herein. As illustrated in block 3252, use data is aggregated into an enterprise view by the enterprise. In block 3254, the enterprise user may add context such as roles, experience, etc. In block 3256, the enterprise user defines roles, skills, experience, etc. required for the team. In block 3258, the remote computing device 106 may receive user input and suggest an optimal team.

Figure 33:
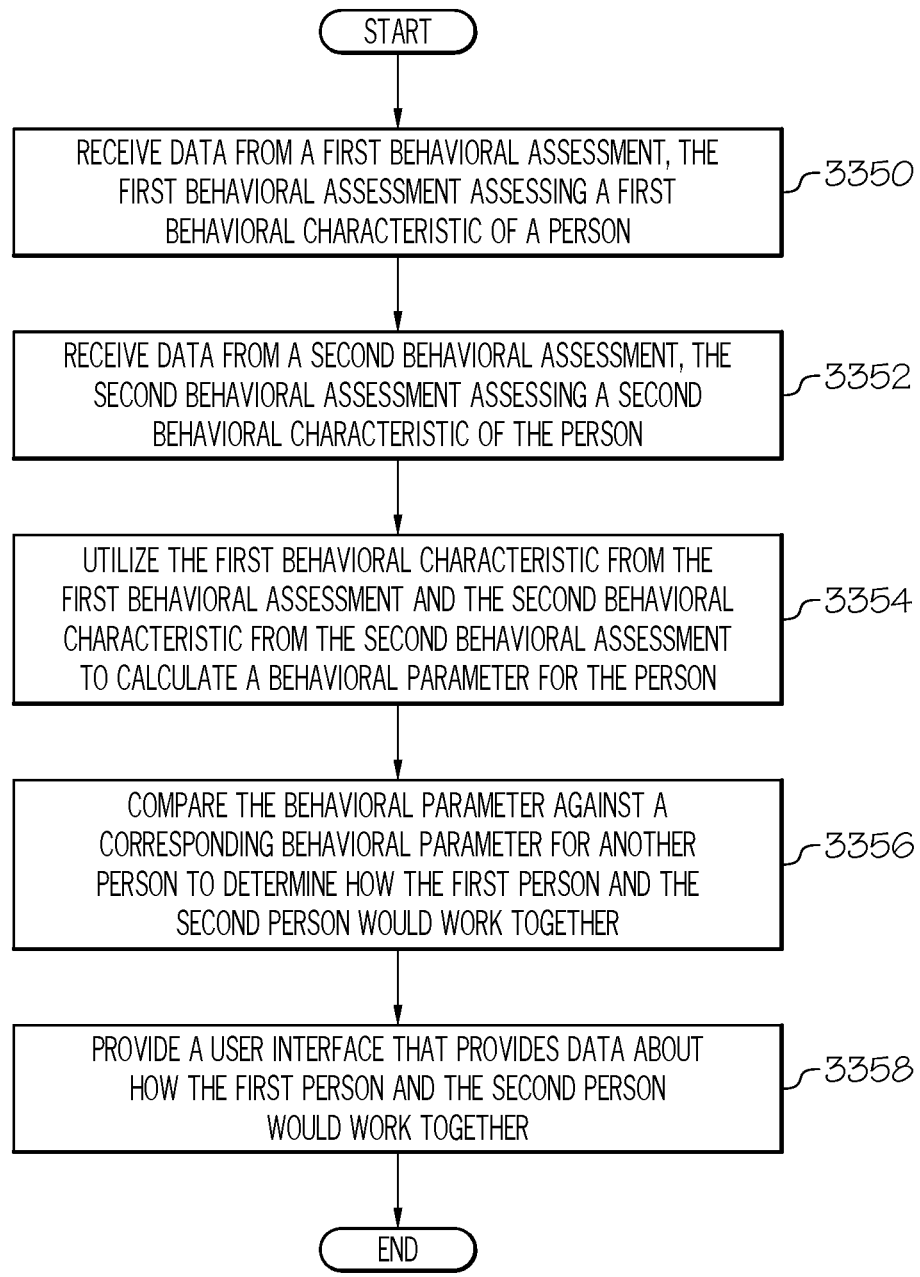
FIG. 33 depicts a flowchart for processing behavioral assessments, according to embodiments described herein.

FIG. 33 depicts a flowchart for processing behavioral assessments, according to embodiments described herein. As illustrated in block 3350, data may be received from a first behavioral assessment, the first behavioral assessment assessing a first behavioral characteristic of a person. In block 3352, data may be received from a second behavioral assessment, the second behavioral assessment assessing a second behavioral characteristic of the person. In block 3354, the first behavioral characteristic from the first behavioral assessment and the second behavioral characteristic from the second behavioral assessment may be utilized to calculate a behavioral parameter for the person. In block 3356, the behavioral parameter may be compared against a corresponding behavioral parameter for another person to determine how the first person and the second person would work together. In block 3358, a user interface may be provided that provides data about how the first person and the second person would work together.

Figure 34:
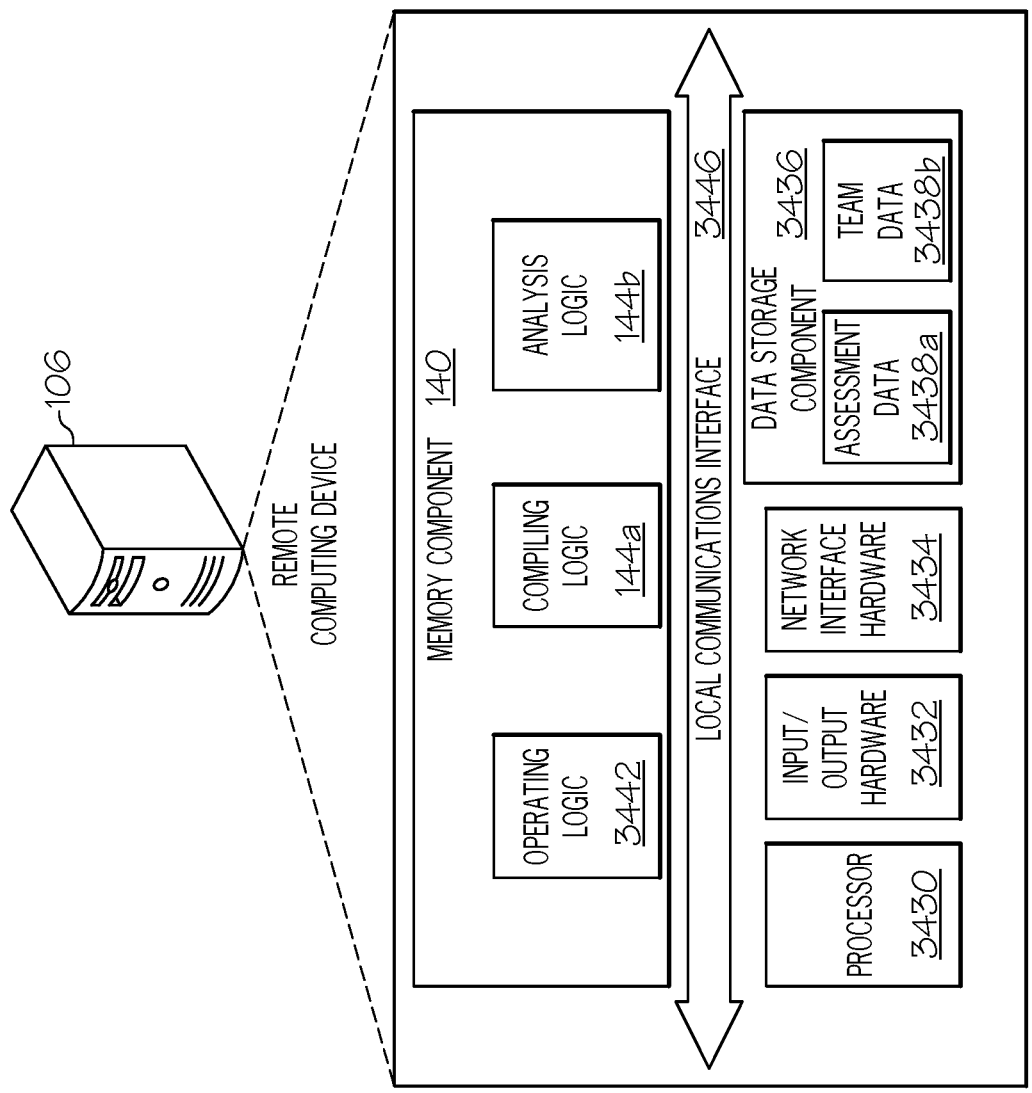
FIG. 34 depicts a remote computing device for processing behavioral assessments, according to embodiments described herein.

FIG. 34 depicts a remote computing device 106 for processing behavioral assessments, according to embodiments described herein. As illustrated, the remote computing device 106, which includes a processor 3430, input/output hardware 3432, network interface hardware 3434, a data storage component 3436 (which stores assessment data 3438a, team data 3438b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 106 and/or external to the remote computing device 106.

The memory component 140 may store operating logic 3442, the compiling logic 144a and the analyzing logic 144b. The compiling logic 144a and the analyzing logic 144b may each include a plurality of different pieces of logic, each of which may be embodied as a computer program, firmware, and/or hardware, as an example. A local interface 3446 is also included in FIG. 34 and may be implemented as a bus or other communication interface to facilitate communication among the components of the remote computing device 106.

The processor 3430 may include any processing component operable to receive and execute instructions (such as from a data storage component 3436 and/or the memory component 140). The input/output hardware 3432 may include and/or be configured to interface with microphones, speakers, a display, and/or other hardware.

The network interface hardware 3434 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the remote computing device 106 and other computing devices, such as the user computing device 102.

The operating logic 3442 may include an operating system and/or other software for managing components of the remote computing device 106. As also discussed above, the compiling logic 144a may reside in the memory component 140 and may be configured to cause the processor 3430 to compile a plurality of different behavioral assessments that were performed on a plurality of different individuals. Similarly, the analyzing logic 144b may be utilized to cause the processor 3430 to perform analysis on the behavioral assessments, provide the user interfaces depicted herein; and provide other functionality described herein.

It should be understood that while the components in FIG. 34 are illustrated as residing within the remote computing device 106, this is merely an example. In some embodiments, one or more of the components may reside external to the remote computing device 106. It should also be understood that, while the remote computing device 106 is illustrated as a single device, this is also merely an example. In some embodiments, the compiling logic 144a and the analyzing logic 144b may reside on different computing devices. As an example, one or more of the functionality and/or components described herein may be provided by the third party computing device 104 and/or user computing device 102, which may be coupled to the remote computing device 106 via the network 100.

Additionally, while the remote computing device 106 is illustrated with the compiling logic 144a and the analyzing logic 144b as separate logical components, this is also an example. In some embodiments, a single piece of logic may cause the remote computing device 106 to provide the described functionality.

As illustrated above, various embodiments for processing behavioral assessments are disclosed. These embodiments may allow a user to construct a virtual team of people and assess the strengths and weaknesses of the team as a whole or individually. Embodiments may additionally recommend other team members, and predicts effects of including new people into a team. These embodiments provide new calculations and analysis to uniquely combine information from behavioral assessments; provide new calculations and analysis to compare team members and/or potential new team members; provide new calculations and analysis to recommend job hires; and/or provide other calculations and analysis described herein, which provide significantly more than what is conventional in the art.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for processing behavioral assessments. It should also be understood that these embodiments are merely exemplary and are not intended to limit the scope of this disclosure.

Therefore, at least the following is claimed:

1. A system for processing third party behavioral assessments comprising:
   a computing device that stores logic that, when executed by the computing device, causes the system to perform at least the following:
   receive data for a first third party behavioral assessment from a first third party computing device operated by a first commercial behavioral assessment provider, the first third party behavioral assessment assessing a first behavioral characteristic of a first person, the first third party behavioral assessment being provided to the first person by the first third party behavioral assessment provider that is distinct from the first person;
   receive data for a second third party behavioral assessment from a second third party computing device operated by a second commercial behavioral assessment provider, the second third party behavioral assessment assessing a second behavioral characteristic of the first person, the second third party behavioral assessment being provided to the first person by the second third party behavioral assessment provider that is different than the first third party behavioral assessment provider and the first person;
   utilize the first behavioral characteristic from the first third party behavioral assessment and the second behavioral characteristic from the second third party behavioral assessment to calculate a behavioral parameter for the first person, wherein calculating the behavioral parameter includes cross mapping the first behavioral characteristic, the second behavioral characteristic, and skill data associated with the first person;
   compare the behavioral parameter against corresponding behavioral parameters for respective persons for a team to determine how the first person and would work with the respective persons;
   render a first user interface for setting team dynamics that includes a team personality option for setting a desired team personality and a team strengths option for setting desired team strengths;
   render a second user interface that receives user input regarding a hypothetical scenario and provides data about how the first person would work with the respective members of the team, wherein the computing device determines underlying behaviors on how the first person should tailor an approach in interacting with the respective members of the team;
   determine whether the first person will be included in the team, based on the desired team personality, the desired team strengths, and the hypothetical scenario from the first user interface and the second user interface; and
   in response to the first person being included in the team, providing an actionable insight about the first person to at least one of the respective members of the team.

2. The system of claim 1, wherein the user interface provides an option to add a new person and an option to delete a person from a comparison with the first person.

3. The system of claim 1, wherein the behavioral parameter includes a score for at least one of the following regarding the first person: personality, culture, strengths, skills and competencies, and a role of the first person.

4. The system of claim 1, wherein the logic further causes the system to perform at least the following: determine a first team rating for a first team; determine a second team rating for a second team; and compare the first team rating with the second team rating.

5. The system of claim 4, wherein the logic further causes the system to create team roles for the first team, wherein the team roles are based on behavioral parameters for each team member in the first team.

6. The system of claim 4, wherein the logic further causes the system to calculate a relationship map that indicates relationships among team members of the first team based on relationship criteria, wherein the relationship criteria may reside along a continuum between conflict and agreement.

7. The system of claim 1, wherein the logic further causes the system to provide an option to define desired behavioral characteristics of a team that includes the first person.

8. The system of claim 1, wherein the logic further causes the system to calculate a behavioral parameter for the first third party behavioral assessment of a team that includes the first person.

9. The system of claim 1, wherein the first person is a job applicant for a position and wherein the logic further causes the system to determine, from the behavioral parameter, whether the first person fits the position.

10. The system of claim 1, wherein the user interface is provided in response to at least one of the following: receiving an electronic communication, beginning a meeting, or scheduling the meeting.

11. The system of claim 10, wherein the logic further causes the system to provide an actionable insight on at least one of the respective persons.

12. A non-transitory computer readable medium for processing behavioral assessments that stores logic that, when executed by a computing device, causes the computing device to perform at least the following:
   receive data for a first behavioral assessment, the first behavioral assessment assessing a first behavioral characteristic of a first person, the first behavioral assessment being provided to the first person by a first behavioral assessment provider that is distinct from the first person;
   receive data for a second behavioral assessment, the second behavioral assessment assessing a second behavioral characteristic of the first person, the second behavioral assessment being provided to the first person by a second behavioral assessment provider that is different than the first person and first behavioral assessment provider;
   utilize the first behavioral characteristic from the first behavioral assessment and the second behavioral characteristic from the second behavioral assessment to calculate a behavioral parameter for the first person, wherein calculating the behavioral parameter includes cross mapping the first behavioral characteristic, the second behavioral characteristic, and skill data associated with the first person;

compare the behavioral parameter against corresponding behavioral parameters for respective persons for a team to determine how the first person and would work with the respective persons;

render a first user interface for setting team dynamics that includes a team personality option for setting a desired team personality and a team strengths option for setting desired team strengths;

render a second user interface that receives user input regarding a hypothetical scenario and provides data about how the first person would fit into a predetermined team, wherein the user interface provides underlying behaviors on how the first person should tailor an approach in interacting with a second person on the predetermined team; and determine whether the first person will be included in the team, based on the desired team personality, the desired team strengths, and the hypothetical scenario.

13. The non-transitory computer readable medium of claim 12, wherein the behavioral parameter includes a score for at least one of the following regarding the first person: personality, culture, strengths, skills and competencies, and a role of the first person.

14. The non-transitory computer readable medium of claim 12, wherein the logic further causes the computing device to provide a user interface for creating the predetermined team, wherein the user interface further provides data to show how the first person will function on the predetermined team.

15. The non-transitory computer readable medium of claim 12, wherein the logic further causes the computing device to create team roles for the predetermined team, wherein the team roles are based on behavioral parameters for each team member in the predetermined team.

16. The non-transitory computer readable medium of claim 12, wherein the first person is a job applicant for a position and wherein the logic further causes the computing device to determine, from the behavioral parameter, whether the first person fits the position.

17. A system for processing behavioral assessments comprising:
  a computing device that stores logic that, when executed by the computing device, causes the system to perform at least the following:
    receive data related to a first third party behavioral assessment, the first third party behavioral assessment assessing a first behavioral characteristic of a first person, the first behavioral assessment being provided to the first person by a first behavioral assessment provider via a third party computing device that is distinct from the first person;
    receive data from a second third party behavioral assessment, the second third party behavioral assessment assessing a second behavioral characteristic of the first person, the first behavioral characteristic being different than the second behavioral characteristic, the second behavioral assessment being provided to the first person by a second behavioral assessment provider via a second third party computing device that is different than the first person and the first behavioral assessment provider;
    utilize the first behavioral characteristic from the first behavioral assessment and the second behavioral characteristic from the second behavioral assessment to calculate a behavioral parameter for the first person, wherein calculating the behavioral parameter includes cross mapping the first behavioral characteristic, the second behavioral characteristic, and skill data associated with the first person;
    compare the behavioral parameter against a corresponding behavioral parameter for respective persons for a team to determine how the first person and the respective persons for the team would work together; and
    render a first user interface for setting team dynamics that includes a team personality option for setting a desired team personality and a team strengths option for setting desired team strengths;
    render a second user interface that provides information to the first person about how the first person and the respective persons for the team would work together, wherein the user interface provides underlying behaviors on how the first person should tailor an approach in interacting with the respective persons for the team; and
    determine whether the first person will be included in the team, based on the desired team personality, the desired team strengths, and the hypothetical scenario.

18. The system of claim 17, wherein the first person is a job applicant for a position and wherein the logic further causes the system to determine, from the behavioral parameter, whether the first person fits the position.

19. The system of claim 1, further comprising:
  receiving data associated with a third third party behavioral assessment, the third third party behavioral assessment assessing a third behavioral characteristic of a first person, the third third party behavioral assessment being provided to the first person by a third third party behavioral assessment provider;
  receiving data associated with a fourth third party behavioral assessment, the third fourth party behavioral assessment assessing a third behavioral characteristic of a first person, the third fourth party behavioral assessment being provided to the first person by a third fourth party behavioral assessment provider; and
  receiving data associated with a fifth third party behavioral assessment, the fifth third party behavioral assessment assessing a third behavioral characteristic of a first person, the fifth third party behavioral assessment being provided to the first person by a fifth third party behavioral assessment provider,
  wherein calculating the behavioral parameter further includes utilizing data from the third third party behavioral assessment, the fourth third party behavioral assessment, and the fifth third party behavioral assessment.

* * * * *